US012682242B2

(12) United States Patent
Tan et al.

(10) Patent No.: US 12,682,242 B2
(45) Date of Patent: Jul. 14, 2026

(54) MIXING SPARSITY COMPRESSION

(71) Applicant: Amazon Technologies, Inc., Seattle, WA (US)

(72) Inventors: Xiaodan Tan, Santa Clara, CA (US); Paul Gilbert Meyer, Jericho, VT (US); Gennady Pekhimenko, Oakville (CA); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1323 days.

(21) Appl. No.: 17/449,576

(22) Filed: Sep. 30, 2021

(65) Prior Publication Data

US 2023/0100930 A1 Mar. 30, 2023

(51) Int. Cl.
*G06N 3/0495* (2023.01)
*G06N 3/04* (2023.01)
*G06N 3/082* (2023.01)

(52) U.S. Cl.
CPC .............. *G06N 3/082* (2013.01); *G06N 3/04* (2013.01)

(58) Field of Classification Search
CPC ........ G06N 3/082; G06N 3/04; G06N 3/0442; G06N 3/048; G06N 3/0495; G06N 3/063; G06N 3/0464
See application file for complete search history.

(56) References Cited

U.S. PATENT DOCUMENTS 11,003,985 B2    5/2021  Kim et al.
11,126,690 B2    9/2021  Azizi 11,182,666 B1 *  11/2021  Phebus ................. G06N 3/048
11,194,549 B2    12/2021  Liu et al.
11,379,556 B2    7/2022  Mattina et al.
11,500,962 B1    11/2022  Meyer et al.
11,625,453 B1    4/2023  Meyer et al.
11,709,783 B1    7/2023  Chen et al.
11,803,736 B1    10/2023  Meyer et al.
12,130,885 B1    10/2024  Meyer et al.
12,417,403 B2 *  9/2025  Muralidharan ........ G06N 20/00
(Continued)

OTHER PUBLICATIONS

International Search Report and Written Opinion dated Jan. 19, 2023 in PCT Application No. PCT/US2022/077280.
(Continued)

*Primary Examiner* — Hien L Duong

(74) *Attorney, Agent, or Firm* — Weaver Austin Villeneuve & Sampson LLP

(57) ABSTRACT

Techniques for compressing a neural network model by mixing compression ratios (sparsity patterns) are described. The weight tensor of a neural network model is divided into weight groups. The pruning cost of compressing the weight values according to a compression ratio is determined for each weight group, and a pruning cost distribution for the compression ratio is generated from the pruning costs of the weight groups. A cost threshold can then be selected from the pruning cost distribution, and weight groups having a pruning cost below the selected cost threshold are compressed according to the compression ratio. The remaining weight groups can be compressed using one or more less aggressive compression ratios. The cost threshold can be adjusted to tune the overall sparsity and accuracy of the compressed neural network.

20 Claims, 17 Drawing Sheets

(56)                References Cited

U.S. PATENT DOCUMENTS

| | | | |
|---|---|---|---|
| 2017/0206089 A1* | 7/2017 | Hosoi | G06F 17/16 |
| 2017/0337471 A1* | 11/2017 | Kadav | G06V 20/52 |
| 2018/0336468 A1* | 11/2018 | Kadav | G06V 10/454 |
| 2018/0349290 A1 | 12/2018 | Staudenmaier et al. | |
| 2019/0012296 A1* | 1/2019 | Hsieh | G06N 3/04 |
| 2019/0362235 A1 | 11/2019 | Xu et al. | |
| 2019/0392300 A1 | 12/2019 | Weber et al. | |
| 2020/0097834 A1 | 3/2020 | Liu et al. | |
| 2020/0143249 A1 | 5/2020 | Georgiadis | |
| 2020/0228137 A1 | 7/2020 | Chinya et al. | |
| 2020/0272425 A1* | 8/2020 | Latorre | G06F 7/57 |
| 2021/0004668 A1* | 1/2021 | Moshovos | G06F 13/4282 |
| 2021/0042617 A1 | 2/2021 | Chinya et al. | |
| 2021/0049423 A1* | 2/2021 | Hu | G06F 18/214 |
| 2021/0081798 A1* | 3/2021 | Cho | G06N 3/082 |
| 2021/0159912 A1 | 5/2021 | Wang et al. | |
| 2021/0224655 A1* | 7/2021 | Jeon | G06N 3/045 |
| 2021/0256380 A1* | 8/2021 | Zhang | G06N 3/10 |
| 2021/0287092 A1* | 9/2021 | Nie | G06N 3/082 |
| 2021/0295168 A1 | 9/2021 | Xu et al. | |
| 2022/0012592 A1* | 1/2022 | Jain | G06N 3/08 |
| 2022/0036189 A1* | 2/2022 | Courville | G06N 3/082 |
| 2022/0076112 A1* | 3/2022 | Wagner | G06N 3/08 |
| 2022/0164671 A1* | 5/2022 | Dong | G06N 3/084 |
| 2022/0172059 A1* | 6/2022 | Yan | G06V 10/454 |
| 2022/0261648 A1* | 8/2022 | Bhalgat | G06N 3/084 |
| 2022/0310068 A1* | 9/2022 | Ren | G10L 15/16 |
| 2022/0310069 A1* | 9/2022 | Ren | G06N 3/0464 |
| 2022/0318604 A1* | 10/2022 | Xu | G06N 3/063 |
| 2022/0343177 A1* | 10/2022 | Kale | G06F 11/073 |
| 2022/0391688 A1* | 12/2022 | Rasch | G06N 3/084 |
| 2023/0056315 A1* | 2/2023 | Wang | G06N 3/082 |
| 2023/0075643 A1* | 3/2023 | Wang | G06N 3/044 |
| 2023/0076138 A1* | 3/2023 | Whatmough | G06N 3/063 |
| 2023/0087152 A1* | 3/2023 | Arai | G06F 8/452 |
| | | | 717/151 |
| 2023/0273828 A1* | 8/2023 | Mahmoud | G06F 9/3836 |
| | | | 712/220 |
| 2023/0274144 A1* | 8/2023 | Ren | G06N 3/084 |
| | | | 706/15 |
| 2023/0276182 A1* | 8/2023 | Zhang | H04R 25/558 |
| | | | 381/315 |

OTHER PUBLICATIONS

See, A. et al., "Compression of Neural Machine Translation Models via Pruning", Computer Science Department, Stanford University, Jan. 1, 2016, 11 pages, Retrieved from the Internet: URL: https://nlp.stanford.edu/pubs/see2016compression.pdf [retrieved on Sep. 24, 2018].

Wang, M. et al., "Balancing memory-accessing and computing over sparse DNN accelerator via efficient data packaging", Journal of Systems Architecture, vol. 117, 2021, 102094, 11 pages. DOI: 10.1016/J.SYSARC.2021.102094.

Pool, Jeff, "Accelerating Sparsity in the NVIDIA Ampere Architecture", NVIDIA, Mar. 2020, 71 pages.

Brownlee, J., "A Gentle Introduction to Sparse Matrices for Machine Learning," Machine Learning Mastery, Mar. 13, 2018 (updated Aug. 9, 2019), pp. 1-14, URL: https://machinelearningmastery.com/sparse-matrices-for-machine-learning/.

EP Rule 161 Communication dated Mar. 11, 2024 in EP Application No. 22794041.8.

Li, Z., et al., "The Lazy Neuron Phenomenon: On Emergence of Activation Sparsity in Transformers," arXiv:2210.06313v2 [cs.LG], Jun. 2023, pp. 1-35, URL: https://arxiv.org/abs/2210.06313v2.

Liu, Z. et al., "Sparse Systolic Tensor Array for Efficient CNN Hardware Acceleration," arXiv:2009.02381v2 [cs.AR], Oct. 12, 2020, pp. 1-13, URL: https://arxiv.org/abs/2009.02381v2.

Pool, J., et al., "Accelerating Inference with Sparsity Using the NVIDIA Ampere Architecture and NVIDIA TensorRT," NVIDIA Technical Blog, Jul. 20, 2021, 5 pages, URL: https://developer.nvidia.com/blog/accelerating-inference-with-sparsity-using-ampere-and-tensorrt/.

U.S. Appl. No. 18/194,055, inventors Tan X, et al., filed Mar. 31, 2023.

U.S. Appl. No. 18/194,072, inventors Tan X, et al., filed Mar. 31, 2023.

U.S. Appl. No. 18/435,566, inventors Romaszkan W, et al., filed Feb. 7, 2024.

U.S. Appl. No. 18/435,571, inventors Romaszkan W, et al., filed Feb. 7, 2024.

U.S. Appl. No. 18/474,129, inventors Meyer et al., filed Sep. 25, 2023.

U.S. Appl. No. 18/509,272, inventors Meyer P G, et al., filed Nov. 14, 2023.

U.S. Appl. No. 18/509,274, inventors Meyer P G, et al., filed Nov. 14, 2023.

U.S. Appl. No. 18/509,275, inventors Meyer P G, et al., filed Nov. 14, 2023.

U.S. Appl. No. 18/509,278, inventors Meyer P G, et al., filed Nov. 14, 2023.

U.S. Appl. No. 18/509,282, inventors Meyer P G, et al., filed Nov. 14, 2023.

U.S. Appl. No. 18/511,722, inventors Meyer P G, et al., filed Nov. 16, 2023.

U.S. Appl. No. 18/882,694, inventors Meyer P G, et al., filed Sep. 11, 2024.

Zhang, Z., et al., "MoEfication: Transformer Feed-forward Layers are Mixtures of Experts," Findings of the Association for Computational Linguistics: ACL 2022, May 2022, pp. 877-890.

Blalock, D. et al. "What Is the State of Neural Network Pruning?", Proc. of the 3rd Machine Learning and Systems (MLSys) Conference, 2020, pp. 1-18, URL: https://proceedings.mlsys.org/paper/2020/file/d2ddea18f00665ce8623e36bd4e3c7c5-Paper.pdf.

Busato, F. et al. "Exploiting NVIDIA Ampere Structured Sparsity with cuSPARSELt," NVIDIA Technical Blog, Dec. 8, 2020, pp. 1-8, URL: https://developer.nvidia.com/blog/exploiting-ampere-structured-sparsity-with-cusparselt/.

EP Office Action dated Dec. 12, 2025 in EP Application No. 22794041.8.

EP Office Action dated May 21, 2026 in EP Application No. 22794041.8.

* cited by examiner

1000

START

Obtain a weight tensor of a neural network model
1002

Divide the weight tensor into multiple weight groups
1004

Determine a pruning cost of compressing the weight values of each weight group according to a first compression ratio
1006

Generate a pruning cost distribution of the weight groups
1008

Select a cost threshold from the pruning cost distribution
1010

Compress a first set of weight groups having a pruning cost below the cost threshold according to the first compression ratio
1012

Compress a second set of weight groups having a pruning cost at or above the cost threshold according to a second compression ratio that is less than the first compression ratio
1014

Retrain the neural network using the sparse neural network model
1016

Sparse neural network model satisfies network accuracy target?
1018

YES

END

Obtain a weight tensor of a neural network model
1102

Perform compression ratio processing for the
weight tensor
1104

Generate a sparse neural network model based
on the compression ratio processing
1106

1200

1300

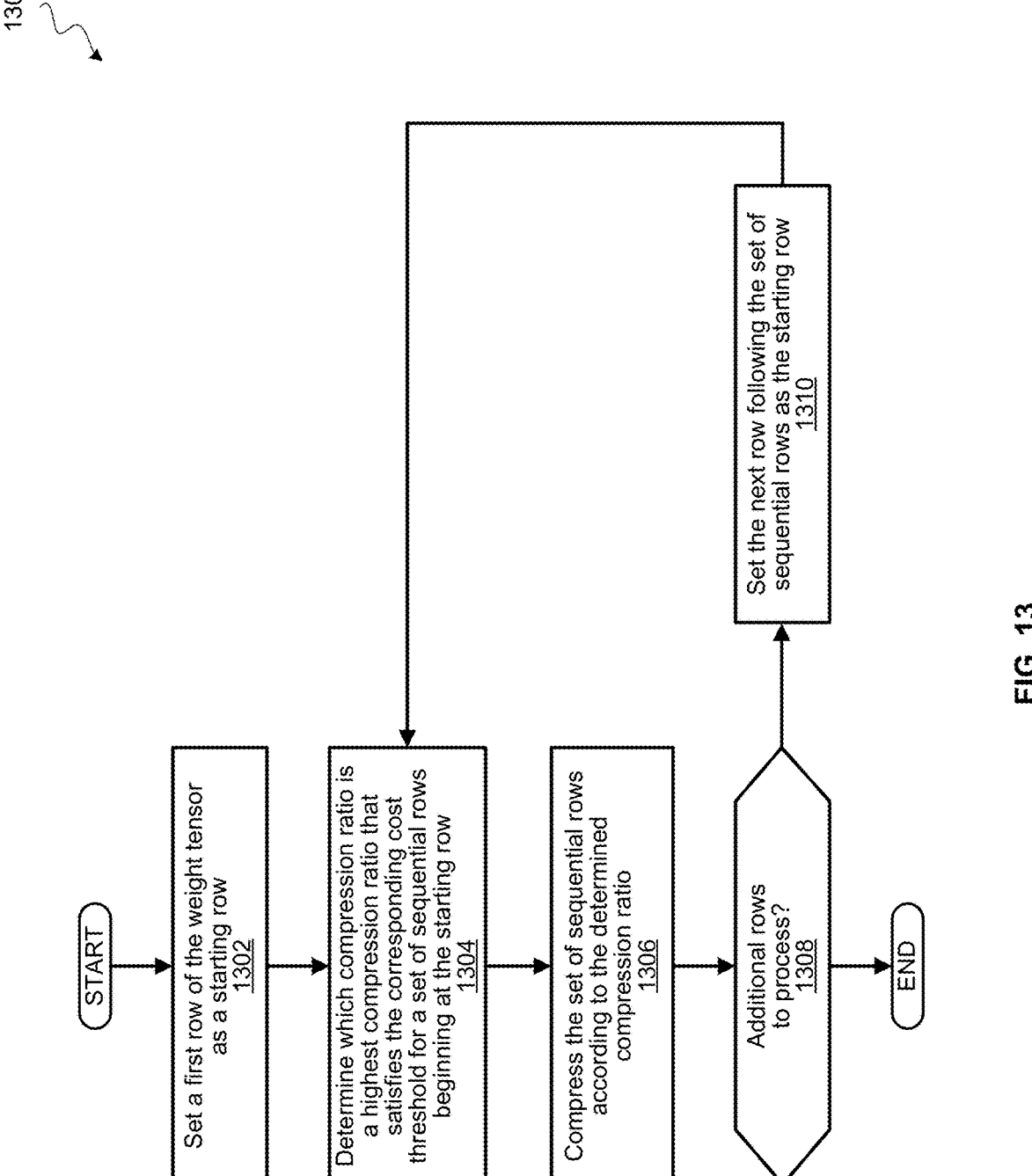

START

Set a first row of the weight tensor as a starting row
1302

Determine which compression ratio is a highest compression ratio that satisfies the corresponding cost threshold for a set of sequential rows beginning at the starting row
1304

Compress the set of sequential rows according to the determined compression ratio
1306

Additional rows to process?
1308

Set the next row following the set of sequential rows as the starting row
1310

END

FIG. 13

MIXING SPARSITY COMPRESSION

BACKGROUND

A neural network can perform computations using a set of weights. Through these computations, the weights are combined with input data (which can also be referred to as feature maps) to perform an inference operation. For example, for a computer vision application to detect an object, the neural network can combine the weights with image data from an input image to extract certain features of the image. Based on the extracted features, the neural network can generate a decision of whether the object is in the image. Complex neural networks may utilize hundreds of thousands to millions of weight values. Each weight value is typically represented as a floating-point number. Thus, performing neural network computations may demand significant computational and storage capacity.

BRIEF DESCRIPTION OF THE DRAWINGS

Various embodiments in accordance with the present disclosure will be described with reference to the drawings, in which:

FIG. 10 illustrates a flow diagram of an example of a process for generating a sparse neural network model;

FIG. 13 illustrates a flow diagram of an example of a process for generating a sparse neural network model based on the compression ratio processing;

DETAILED DESCRIPTION

Figure 1:
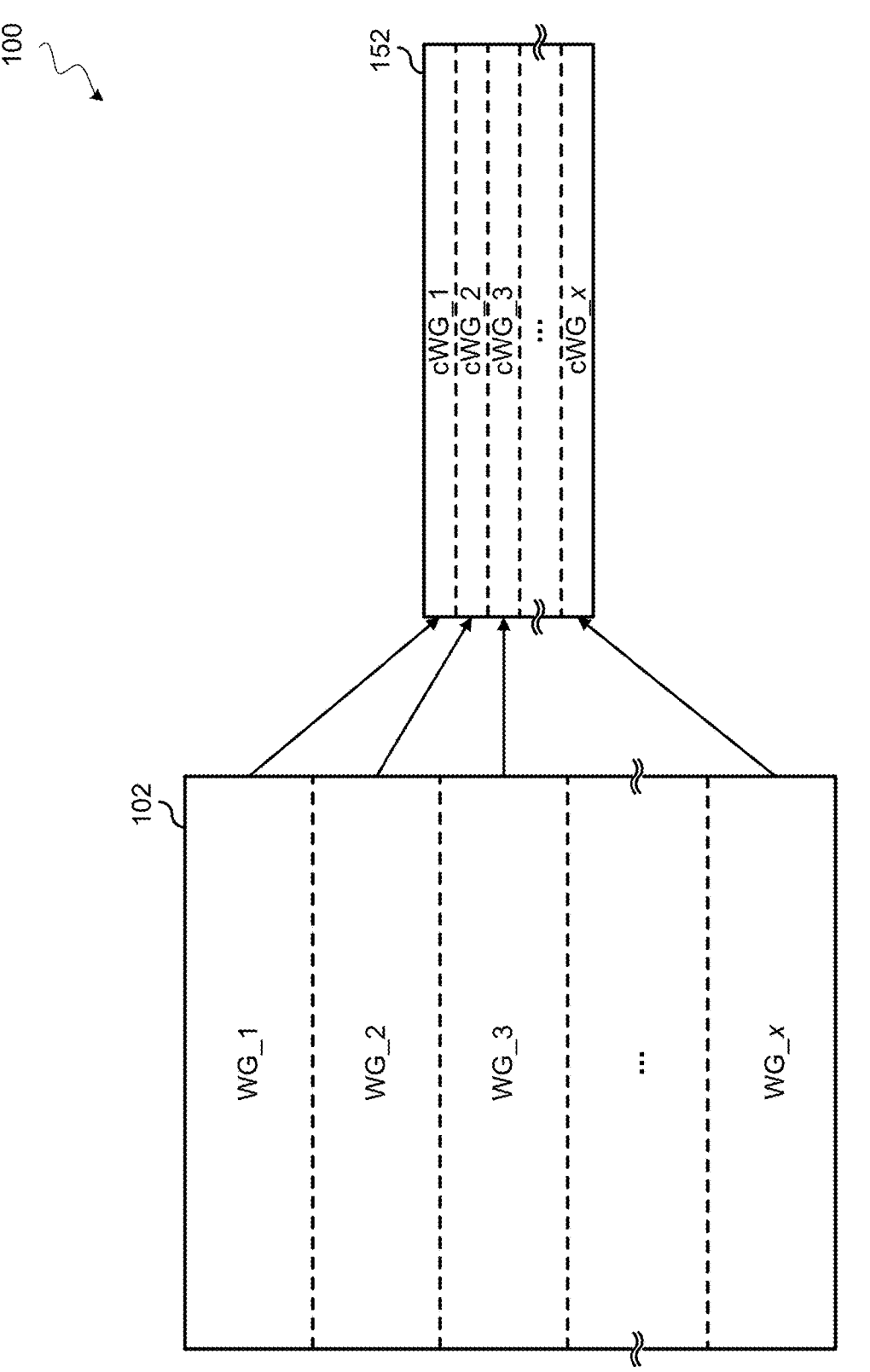
FIG. 1 illustrates an example of compressing a weight tensor.

Neural networks are often over-parameterized, meaning that the weight values representing the neural network model can be pruned (replaced with zeros) without incurring a significant accuracy loss when performing an inference operation. By replacing certain weight values with zeros, the computation and storage requirements of the neural network can be reduced. A certain compression ratio can be applied to the weights of a neural network. For example, a compression ratio of 16:4 may prune 75% of the smallest weight values by replacing them with zeros.

However, different neural network models for different applications may have varying degrees of density (percentage of non-zero weight values), and applying the same compression ratio to the different models may yield different accuracy loss of the pruned model. Some applications can be more sensitive to accuracy loss than others. For example, an object recognition model used for autonomous vehicle navigation may require a much higher accuracy to avoid collisions, whereas a lower accuracy may be acceptable for an object recognition model used for image database searching. As such, neural network models for applications that are more tolerant to accuracy loss can be compressed or pruned more aggressively than applications that are more sensitive to accuracy loss.

Moreover, different layers or different sections of a neural network model may also exhibit varying degrees of density and have different impact on the overall accuracy of the model. For example, higher layers closer to the output can have a lower density than the initial or middle layers of a neural network model, and more aggressive pruning of the higher layers may have less impact on the accuracy loss of the model than pruning the initial layers. Accordingly, applying the same compression ratio across the different layers/sections of a model or across different models may not always provide the optimal results.

The techniques disclosed herein provide the flexibility to tune the compression of a neural network model by applying different compression ratios to different parts of a model. The weight values of different sections or weight groups (groups of weight values such as rows of a weight tensor) of a model are analyzed to select a suitable compression ratio to use for pruning the weight group. This allows useful weight values to be kept while less impactful weight values are replaced with zeros. Different weight groups of the neural network model can be compressed with different compression ratios. Although each weight group is still compressed based on a ratio of integers, the overall compression factor for the neural network model as a whole is not limited to a ratio of integers because different weight groups can contribute varying degrees of compression. By tuning the compression ratios as applied to the different weight groups of the model, the overall compression factor can also be adjusted to meet a certain accuracy target.

To tune the overall compression factor to achieve a certain accuracy target, a weight tensor of a neural network model is divided into multiple weight groups. The pruning cost of compressing the weight values according to a compression ratio is determined for each weight group, and a pruning cost distribution for the compression ratio is generated from the pruning costs of the weight groups. A cost threshold can then be selected from the pruning cost distribution, and weight groups having a pruning cost below the selected cost threshold are compressed according to the compression ratio. The remaining weight groups can be compressed using one or more less aggressive compression ratios, and some of the remaining weight groups can remain uncompressed. The resulting compressed weight tensor representing a sparse neural network model can be retrained, and the performance of the retrained sparse neural network using the compressed weight tensor is compared with the original model to determine the accuracy loss of applying the compression. If the compressed weight tensor is unable to meet the accuracy target, a smaller cost threshold is selected, and the process is repeated to adjust the mix of weight groups at different compression ratios to achieve the accuracy target.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a conceptual diagram 100 of one way to compress a weight tensor 102. Weight tensor 102 is obtained from a pre-trained neural network model, and is shown as a two-dimensional weight matrix with weight values arranged in rows and columns. Neural networks in general can be represented using multi-dimensional weight matrices. For neural network models such as multilayer perceptron (MLP) or other types of neural networks with linear operations, the model can take the form of two-dimensional weight matrices. For more complex networks such as convolutional neural networks, the neural network model can take the form of higher dimensionality weight matrices. In any event, weight matrices of higher dimensions can be flattened and expressed as a two-dimensional weight matrix. For example, a convolution layer such as Conv2d with 256 input channels, 256 output channels, and a 3×3 filter size can be represented using a four-dimensional weight matrix with dimensionality of 256×256×3×3. Such a 4D weight matrix can be flattened to a 256×2304 two-dimensional weight tensor. Accordingly, although weight tensor 102 is shown as two-dimensional, the compression techniques can be applied to weight matrices of higher dimensionality by flattening them into a two-dimensional tensor representation.

To reduce the computation and storage requirements of operating on weight tensor 102, a compression ratio expressed as L:R can be applied to weight tensor 102, where L represents the number of original weight values in a group size, and R represents the compressed number of weight values after pruning. For example, L can represent the number of rows of original weight values in a group, and R can represent the compressed number of rows of weight values after pruning a group. Hence, a compression ratio of 16:4 may refer to compressing sixteen rows of original weight values into four compressed rows of weight values after pruning. In some implementations, the values of L and R can be based on the native compression support of the hardware executing the neural network model. For example, a neural network processor implementing a systolic array (e.g., an array of multiply-and-accumulate computational circuits arranged in rows and columns) that has sixteen different channels of input feature maps flowing across every four rows of the array can provide native hardware support for compressions up to a 16:4 compression ratio, and the values of L and R for such hardware can be L 16 and R 4.

Using the compression ratio of 16:4 as an example, weight tensor 102 is divided into multiple weight groups WG_1 to WG_x, each being a row group of sixteen rows of weight values. Each weight group is then compressed from 16 rows into 4 rows of weight values by replacing the 12 smallest magnitude weight values of each column with zeros. For instance, the sixteen rows of weight group WG_1 is compressed into compressed weight group cWG-1 having just four rows of weight values, the sixteen rows of weight group WG_2 is compressed into compressed weight group cWG-2 having four rows of weight values, and so on to generate the compressed weight tensor 152. As compared to weight tensor 102, compressed weight tensor 152 is 75% smaller in terms of the number of weight values being stored. The actual memory savings is slightly less because metadata indicating the position (e.g., original row number) of each weight value is also stored.

Figure 2:
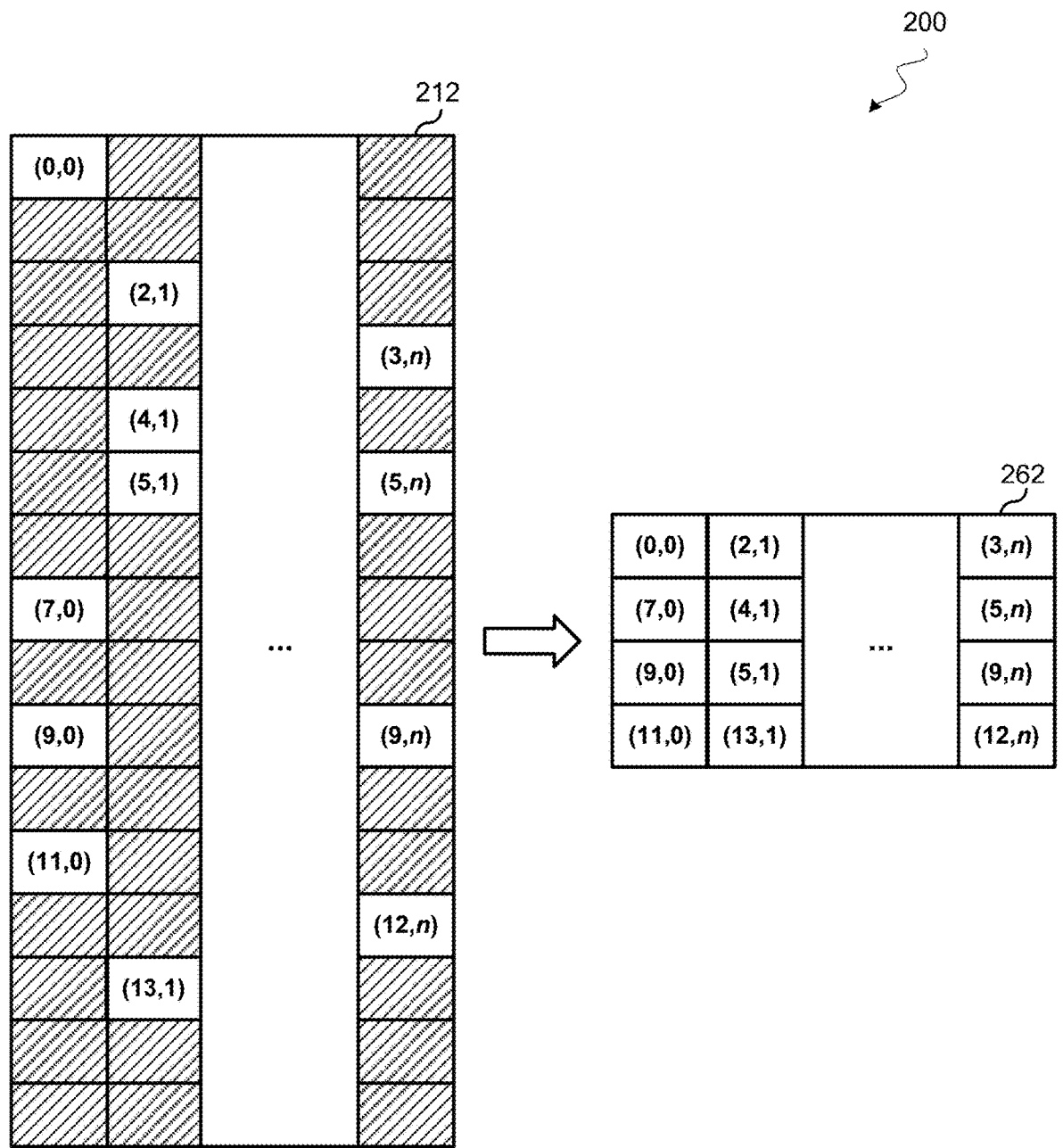
FIG. 2 illustrates an example of compressing a weight group.

FIG. 2 illustrates a conceptual diagram 200 of an example of compressing or pruning a weight group. Uncompressed weight group 212 can be one of the weight groups WG_1 to WG_x of weight tensor 102, and may include sixteen rows of weight values as shown. To compress the sixteen rows of weight values in weight group 212 into the four rows of weight values in compressed weight group 262, each column of weight group 212 is pruned by replacing the twelve smallest magnitude weight values in the column with zeros. Put another way, compressed weight group 262 is generated by keeping the four largest magnitude weight values from each column of weight group 212. It should be noted that the pruning operation operates on the magnitude or absolute value of the weight values. For instance, a weight of −10.9 has a magnitude or absolute value that is greater than a weight of 4.5, and hence the weight value of 4.5 will be pruned before the weight value of −10.9 is considered.

Referring to the first column (column 0) of weight group 212, the twelve smallest magnitude weight values are represented using a diagonal fill pattern to indicate the weight value is being replaced with zero, and the four largest magnitude weight values are represented using their matrix indices expressed as (row, column). Hence, the four largest magnitude weight values in column 0 appear at rows 0, 7, 9, and 11. Similarly, the four largest magnitude weight values in column 1 appear at rows 2, 4, 5, and 13, and the four largest magnitude weight values in column n appear at rows 3, 5, 9, and 12. It should be noted that any of the smallest magnitude weight values represented by the diagonal fill pattern can have an original value being a non-zero value or a zero value, and that the largest magnitude weight values in a column being kept can also include one or more zero values (e.g., if more than twelve of the original weight values in a column have a zero value).

To generate compressed weight group 262, the four largest magnitude weight values from each column of weight group 212 are stored in four rows of weight values. Thus, column 0 of compressed weight group 262 includes the weight values at indices (0,0), (7,0), (9,0), and (11,0) of weight group 212; column 1 of compressed weight group 262 includes the weight values at indices (2,1), (4,1), (5,1), and (13,1) of weight group 212; and column n of compressed weight group 262 includes the weight values at indices (3,n), (5,n), (9,n), and (12,n) of weight group 212.

The smallest magnitude weight values of weight group 212 that have been replaced with zeros need not be stored in compressed weight group 262, because a zero weight value does not contribute to the computational result of the matrix multiplication operations of the neural network model. However, the original position or row number of the weight values in compressed weight group 262 may need to be known during matrix multiplication operations such that the weight value can be combined with the proper input feature map value. As such, metadata indicating the position or row number of each weight value in compressed weight group 262 is generated and stored with compressed weight group 262. By way of example, the metadata associated with a weight value can be a four-bit value representing the original row number of the row that the weight value belongs to in weight group 212.

Referring back to FIG. 1, a similar process can be repeated for each of weight groups WG_1 to WG_x of weight tensor 102 to generate the compressed weight groups cWG_1 to cWG_x of compressed weight tensor 152. The sparsity (defined as the number of zero weight values divided by the total number of weight values) of the weight tensor represented by compressed weight tensor 152 is at a minimum 75% because twelve out of every sixteen weight values of each column of every row group have been set to a zero value. Accordingly, compressed weight tensor 152 can be used to implement a sparse neural network model having at least 75% zero weight values.

Although such a compression technique can be used to reduce the computation and memory requirements of the neural network model, pruning too many non-zero weight values may negatively impact the accuracy of the model. In some implementations, aggressive pruning can result in an accuracy loss that is beyond an acceptable target. In such scenarios, the compression ratio used to compress the weight tensor can be reduced. For example, instead of using a 16:4 compression ratio to provide 4× compression, a 12:4 compression ratio can be used to provide a less aggressive 3× compression. Although reducing the compression ratio can improve the accuracy, applying a single compression ratio across the board may not always result in the optimal amount of compression. For example, the optimal compression rate to meet a certain accuracy target can be somewhere between 4× and 3×, and it can be difficult to achieve the optimal compression rate if a single compression ratio is applied across the board because the compression ratio is limited to a ratio of integers.

As discussed above, different weight groups of a neural network model may have varying degrees of impact on the accuracy of the model. To provide an analytical framework that can be used to adjust the overall compression factor of a model to meet a certain accuracy target, the pruning cost of compressing each weight group of a weight tensor according to a compression ratio can be determined. The pruning cost of compressing a weight group according to a compression ratio can be determined by calculating the average of absolute values of the weight values being replaced with zeros. For example, referring to FIG. 2, the pruning cost of compressing weight group 212 with a compression ratio of 16:4 can be calculated by summing the absolute values of all weight values represented by the diagonal fill pattern, and dividing that sum by the number of weight values represented by the diagonal fill pattern. Weight groups with a high number of weight values much greater than zero are expected to have a higher pruning cost than weight groups with weight values closer to zero. By determining the pruning cost of each weight group in a weight tensor, a pruning cost distribution of applying a certain compression ratio to the weight tensor can be generated.

Figure 3:
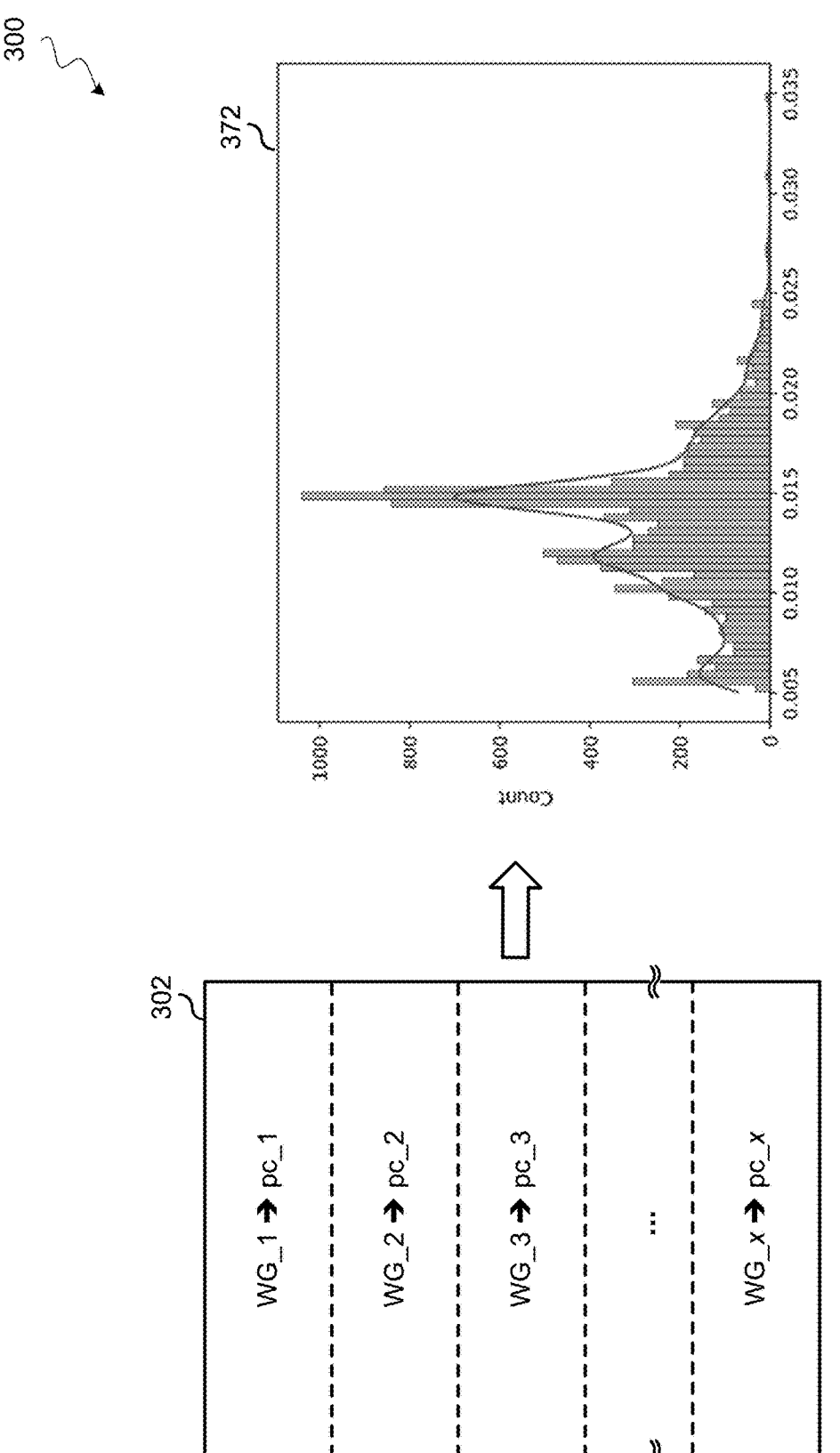
FIG. 3 illustrates an example of generating a pruning cost distribution.

FIG. 3 illustrates a conceptual diagram 300 of an example of generating a pruning cost distribution 372 of an uncompressed weight tensor 302. Weight tensor 302 is divided into multiple weight groups WG_1 to WG_x based on the compression ratio. For example, each weight group can have sixteen rows of weight values for a 16:4 compression ratio. For each of the weight groups WG_1 to WG_x, a pruning cost of compressing the weight values of the weight group according to the compression ratio is determined by calculating the average of absolute values of the weight values being replaced with zeros in the corresponding weight group. For instance, weight group WG_1 may yield a pruning cost of pc_1, weight group WG_2 may yield a pruning cost of pc_2, weight group WG_3 may yield a pruning cost of pc_3, and weight group WG_x may yield a pruning cost of pc_x, and so on.

A pruning cost distribution 372 of compressing weight tensor 302 at the compression ratio can then be generated, for example, as a histogram by counting the number of occurrences of each pruning cost value. As each weight group corresponds to one pruning cost, the total number of counts in pruning cost distribution 372 is equal to the total number of weight groups. Weight groups having smaller magnitude weight values tend to have a smaller pruning cost than weight groups having larger weight values, and sparser weight groups values tend to have a smaller pruning cost than denser weight groups. Pruning cost distribution 372 can provide an overview of how the weight values in weight tensor 302 are being distributed in the weight groups given a particular weight group size based on the compression ratio.

Figure 4:
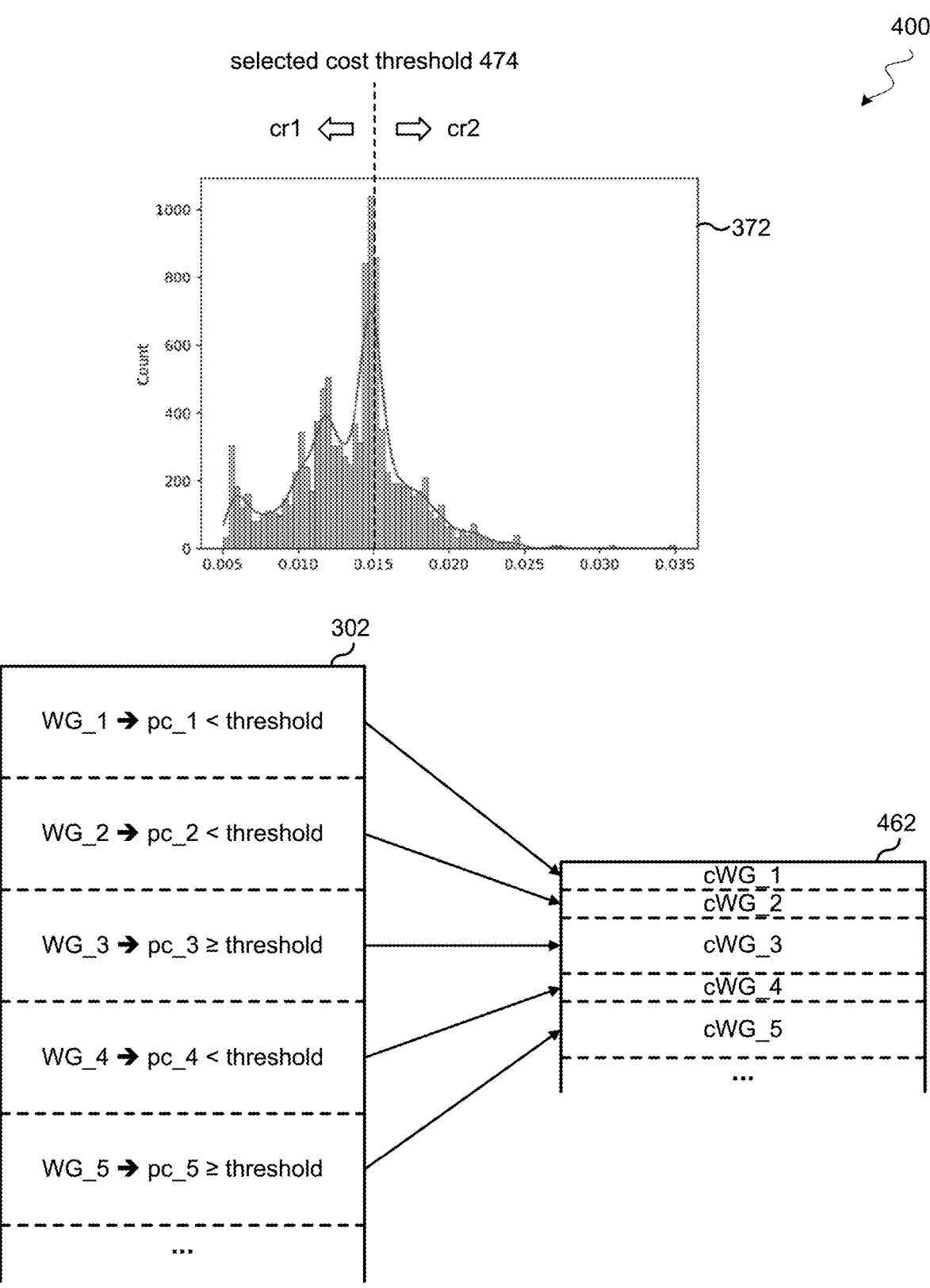
FIG. 4 illustrates an example of using a pruning cost distribution to compress a weight tensor.

FIG. 4 illustrates an example of using a pruning cost distribution to compress a weight tensor with mixed compression ratios. Referring to FIG. 4, having generated the pruning cost distribution 372 for compressing weight tensor 302 according to a certain compression ratio cr1, a cost threshold 474 is selected from the pruning cost distribution 372. In some implementations, cost threshold 474 can be selected arbitrarily. Cost threshold 474 can be selected arbitrarily because the cost threshold can be adjusted at later steps if the compression performed based on the selected cost threshold yields an accuracy loss that doesn't meet the accuracy target. In some implementations, cost threshold 474 can be selected based on a statistical criterion. For example, cost threshold 474 can be selected as the mean of the pruning cost distribution, the median of the pruning cost distribution, or as one or more standard deviations above or below the mean, etc. In the example shown in FIG. 4, the selected cost threshold 474 is 0.15, which is roughly the midpoint of pruning cost distribution 372, though other values of cost threshold can alternatively be used.

Once cost threshold 474 has been selected, the pruning cost of each weight group of weight tensor 302 is compared with the selected cost threshold 474 to determine whether the pruning cost is below the selected cost threshold 474. To generate the compressed weight tensor 462, weight groups that have a pruning cost below the selected cost threshold 474 can be compressed using the compression ratio of pruning cost distribution 372 (indicated as compression ratio cr1 in FIG. 4), and weight groups that have a pruning cost at or above the selected cost threshold 474 can be compressed using a less aggressive compression ratio (indicated as compression ratio cr2 in FIG. 4, which is less than compression ratio cr1).

By way of example, the pruning cost pc_1 of weight group WG1 can be less than the selected cost threshold 474, and thus weight group WG1 is compressed to compressed weight group cWG_1 using compression ratio cr1. Similarly, the pruning cost pc_2 of weight group WG2 can be less than the selected cost threshold 474, and thus weight group WG2 is compressed to compressed weight group cWG_2 using compression ratio cr1; and the pruning cost pc_4 of weight group WG4 can be less than the selected cost threshold 474, and thus weight group WG4 is also compressed to compressed weight group cWG_4 using compression ratio cr1. For instance, if compression ratio cr1 is 16:4, then each of weight groups WG_1, WG_2, and WG_4 can be compressed from sixteen rows of weight values down to four rows of weight values to form compressed weight groups cWG_1, cWG_2, and cWG_4, respectively. Similar operations can be performed for each weight group having a pruning cost that is less than the selected cost threshold 474.

In contrast, the pruning cost pc_3 of weight group WG3 can be at or greater than the selected cost threshold 474, and thus weight group WG3 is compressed to compressed weight group cWG_3 using a less aggressive compression ratio cr2. Similarly, the pruning cost pc_5 of weight group WG5 can be greater than the selected cost threshold 474, and thus weight group WG5 is compressed to compressed weight group cWG_5 using compression ratio cr2. For instance, if compression ratio cr1 is 16:4, then a less aggressive compression ratio cr2 can be 8:4. Weight group WG_3, which includes sixteen rows of weight values, can be divided into two weight subgroups each containing eight rows of weight values, and the two weight subgroups can be compressed from eight rows of weight values down to four rows of weight values according to the compression ratio cr2 of 8:4. The two compressed subgroups are collectively shown as compressed weight group cWG_3, which contains a total of eight rows of weight values. Hence, the sixteen rows in weight group WG_3 are compressed to a total of eight rows in compressed weight group cWG_3 in this example. Similar operations can be performed for weight group WG_5 and other weight groups having a pruning cost at or greater than the selected cost threshold 474.

As shown in FIG. 4, the compressed weight tensor 462 is generated by applying two compression ratios cr1 and cr2 to different weight groups of the original weight tensor 302 to implement a sparse neural network model. The compressed weight tensor 462 has an overall compression factor between 4× and 2×, depending on the number of weight groups falling below the selected cost threshold 474, and the overall compression factor can be tuned by shifting the selected cost threshold 474 to adjust the number of weight groups falling below the selected cost threshold 474. In addition to replacing the set of smallest weight values with zeros and eliminating those zero weight values from storage, metadata indicating the position (e.g., row number) of each of the remaining weight values are generated and stored with compressed weight tensor 462.

Having generated compressed weight tensor 462, a sparse neural network model implemented with compressed weight tensor 462 can be retrained using standard training procedures, but ensuring that the zeroed-out (pruned) weight elements do not contribute to losses during training in the forward pass to avoid gradient updates to these weight elements. The accuracy of the retrained sparse neural network model can be compared with the original neural network model to determine whether the sparse neural network model satisfies a network accuracy target (e.g., within a certain percentage accuracy of the original model). If the sparse neural network model fails to satisfy the network accuracy target, a lower cost threshold can be selected from pruning cost distribution 372 to generate a second sparse neural network model having a lower compression factor. The amount to shift the cost threshold can be based on the proximity to the accuracy target. For example, the cost threshold can be adjusted by a larger amount if the accuracy is far from the accuracy target, or can be adjusted by a smaller amount if the accuracy is close to the accuracy target.

In some implementations, if the accuracy of the sparse neural network model is well above the accuracy target, this may mean that the model can be compressed more aggressively and still meet the accuracy target. In such scenarios, a higher cost threshold can be selected to generate a second sparse neural network model having a higher compression factor, and the process can be repeated to achieve the optimal compression while still meeting the accuracy target.

Figure 5:
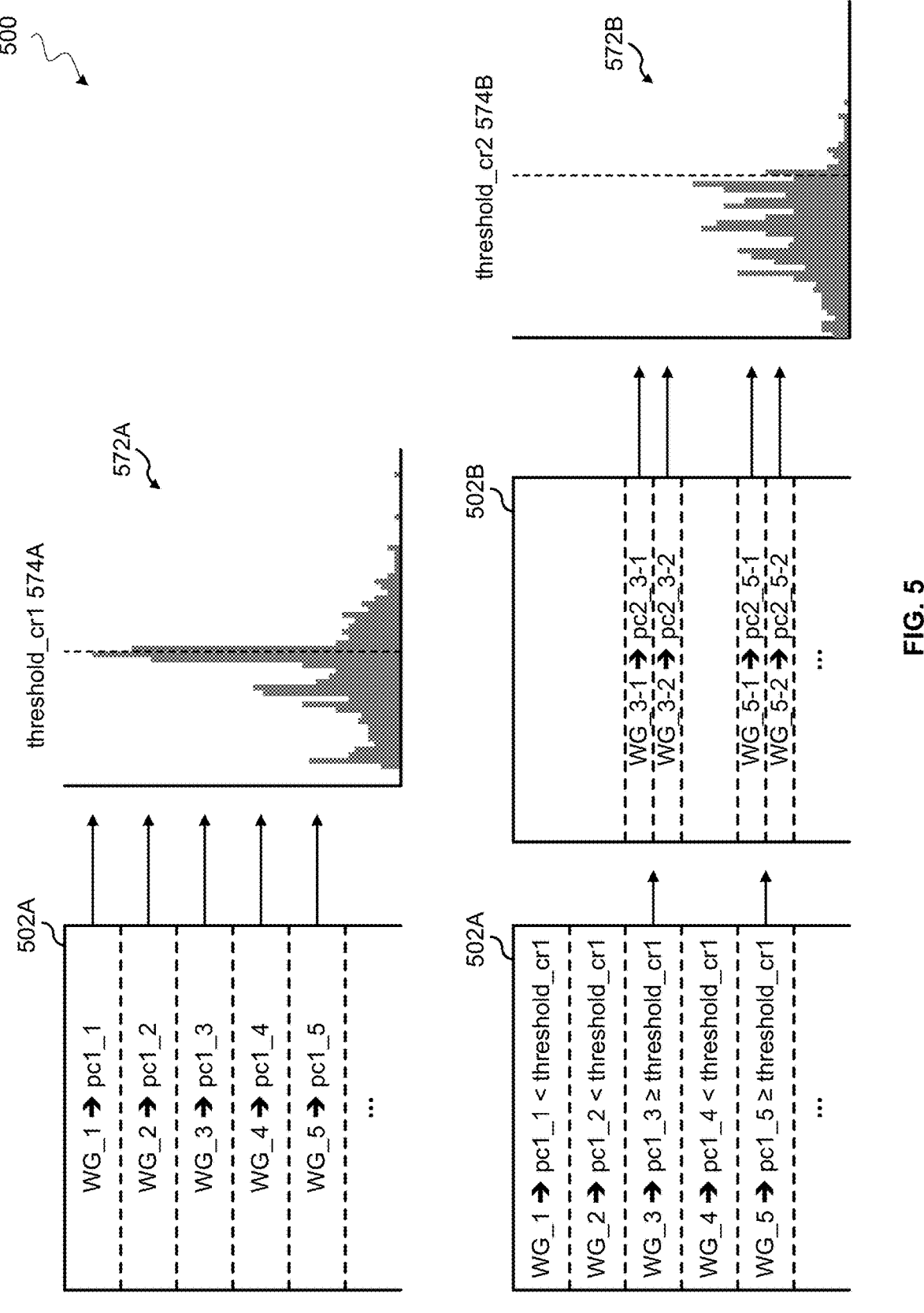
FIG. 5 illustrates an example of a technique to apply more than two compression ratios to a weight tensor.

As described above, a weight tensor can be compressed by applying two different compression ratios to different weight groups of the weight tensor. This technique can also be extended to utilize more than two compression ratios and/or to leave certain weight groups in their original uncompressed state. FIG. 5 illustrates a conceptual diagram 500 of an example of a technique to apply more than two compression ratios to a weight tensor.

Referring to FIG. 5, an uncompressed weight tensor 502A is divided into weight groups WG_1 to WG_5, and so on, according to a first compression ratio cr1. Similar to the technique described above with refence to FIG. 3, a pruning cost is determined for each of the weight groups to generate a pruning cost distribution 572A. Having generated pruning cost distribution 572A, a first cost threshold 574A (indicated as threshold_cr1 in FIG. 5) is selected for the first compression ratio cr1 similar to the technique described above with reference to FIG. 4. The pruning cost of each of the weight groups is compared with threshold_cr1 574A to determine if the pruning cost is below threshold_cr1 574A. If the pruning cost of the weight group is below threshold_cr1 574A, the weight group is compressed according to compression ratio cr1.

For the remaining weight groups that have a pruning cost at or above threshold_cr1 574A, each remaining weight group shown in weight tensor 502B is further divided into weight subgroups according to a second compression ratio cr2 that is less than the first compression ratio cr1. A subgroup pruning cost of compressing the weight values of each weight subgroup according to the second compression ratio cr2 is determined to generate a subgroup pruning cost distribution 572B of the weight subgroups. Having generated the subgroup pruning cost distribution 572B, a second cost threshold 574B (indicated as threshold_cr2) for the second compression ratio cr2 can be selected.

By way of example, if compression ratio cr1 is 16:4, and weight groups WG_3 has a pruning cost at or above threshold_cr1 574A, then weight group WG_3 can be further divided into weight subgroups WG_3-1 and WG_3-2 according to a less aggressive compression ratio cr2 such as 8:4. The subgroup pruning cost of compressing WG_3-1 according to compression ratio cr2 can be determined as pc2_3-1, and subgroup pruning cost of compressing WG_3-2 according to compression ratio cr2 can be determined as pc2_3-2. Similarly, weight group WG_5 having a cost threshold at or greater than threshold_cr1 574A can be further divided into weight subgroups WG_5-1 and WG_5-2 according to compression ratio cr2, and their respective subgroup pruning costs can be determined as pc2_5-1 and pc2_5-2. These subgroup pruning costs together with those of other weight subgroups derived from weight groups that do not meet threshold_cr1 574A are used to generate subgroup pruning cost distribution 572B, which represents the pruning cost distribution for compression ratio cr2 for the remaining weight groups. Similar to threshold_cr1 574A, threshold_cr2 574B can be selected arbitrarily or according to a statistical criterion. The value of threshold_cr2 574B can be the same as or different than threshold_cr1 574A.

Figure 6:
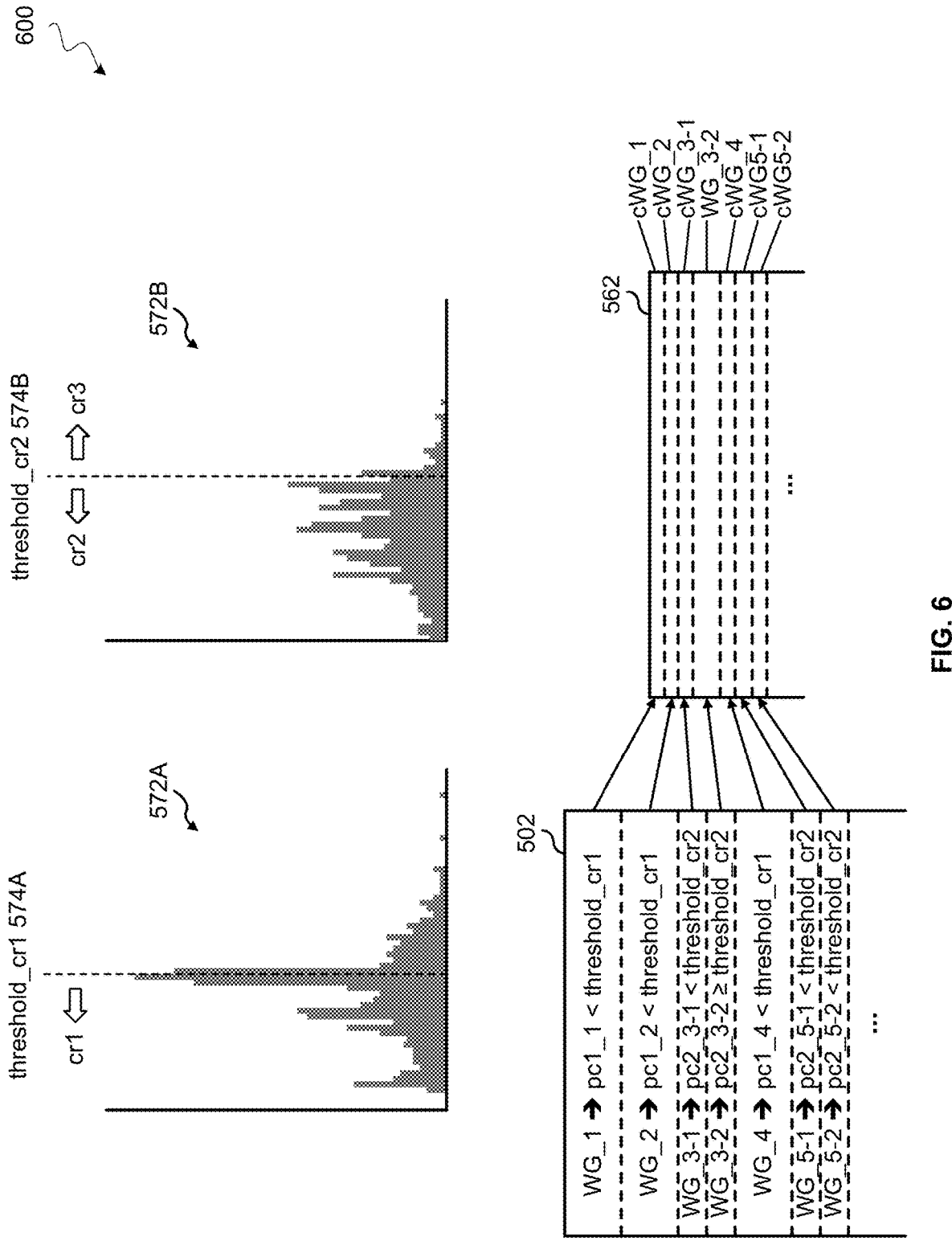
FIG. 6 illustrates an example of compressing a weight tensor using more than two compression ratios.

FIG. 6 illustrates a conceptual diagram 600 of an example of compressing a weight tensor using more than two compression ratios. Continuing with the example from FIG. 5, having generated the pruning cost distribution 572A and subgroup pruning cost distribution 572B, and then selecting threshold_cr1 574A and threshold_cr2 574B, the weight tensor 502 can be compressed into compressed weight tensor 562 as follows. For each of the weight groups that has a pruning cost below threshold_cr1 574A for compression ratio cr1, the weight group is compressed according to compression ratio cr1. For the remaining weight groups, the weight subgroups in those remaining weight groups are examined to determine if the subgroup pruning cost of each subgroup is below threshold_cr2 574B. If the subgroup pruning cost of a subgroup is below threshold_cr2 574B, then the subgroup is compressed according to compression ratio cr2. If the subgroup pruning cost is at or above threshold_cr2 574B, the subgroup is compressed using compression ratio cr3, which is less than compression ratio cr2. In some implementations, compression ratio cr3 can be a ratio of a one-to-one correspondence such as 4:4 (e.g., an uncompressed ratio).

By way of example, referring to FIG. 6, compression ratio cr1 can be 16:4, compression ratio cr2 can be 8:4, and compression ratio cr3 can be 4:4. Weight groups WG_1, WG_2, and WG_4 may have a pruning cost associated with compression ratio cr1 that is below threshold_cr1 574A. As such, the sixteen rows of each of weight groups WG_1, WG_2, and WG_4 can be compressed into four rows of each of compressed weight groups cWG_1, cWG_2, and cWG_4, respectively. Weight groups WG3 and WG5 may have a pruning cost associated with compression ratio cr1 that is at or above threshold_cr1 574A. As such, these weight groups are analyzed under their subgroups with compression ratio cr2. Weight subgroups WG_3-1, WG_5-1, and WG_5-2 may have a pruning cost associated with compression ratio cr2 that is below threshold_cr2 574B. As such, the eight rows of each of weight groups WG_3-1, WG_5-1, and WG_5-2 can be compressed into four rows of each of compressed weight groups cWG_3-1, cWG_5-1, and cWG_5-2, respectively. Weight subgroup WG_3-2 may have a pruning cost associated with compression ratio cr2 that is at or above threshold_cr2 574B. As such, weight subgroup WG_3-2 can be compressed according to compression ratio cr3, which in this example is an uncompressed ratio of 4:4. As such, the weight values associated with weight subgroup WG_3-2 remains as an uncompressed weight group in compressed weight tensor 562.

A process similar to those describe above can be performed to determine whether a sparse neural network model retrained with compressed weight tensor 562 satisfies a network accuracy target, and whether to make any adjustments to threshold_cr1 574A and/or threshold_cr2 574B. In some implementations, coarser adjustment to the overall compression factor can be made by adjusting threshold_cr1 574A for the larger compression ratio cr1, and finer adjustment to the overall compression factor can be made by adjusting threshold_cr2 574B for the smaller compression ratio cr2. It should be noted that the technique described above with respect to FIGS. 5-6 can also be extended to apply additional compression ratios by further subdividing the weight subgroups.

Figure 7:
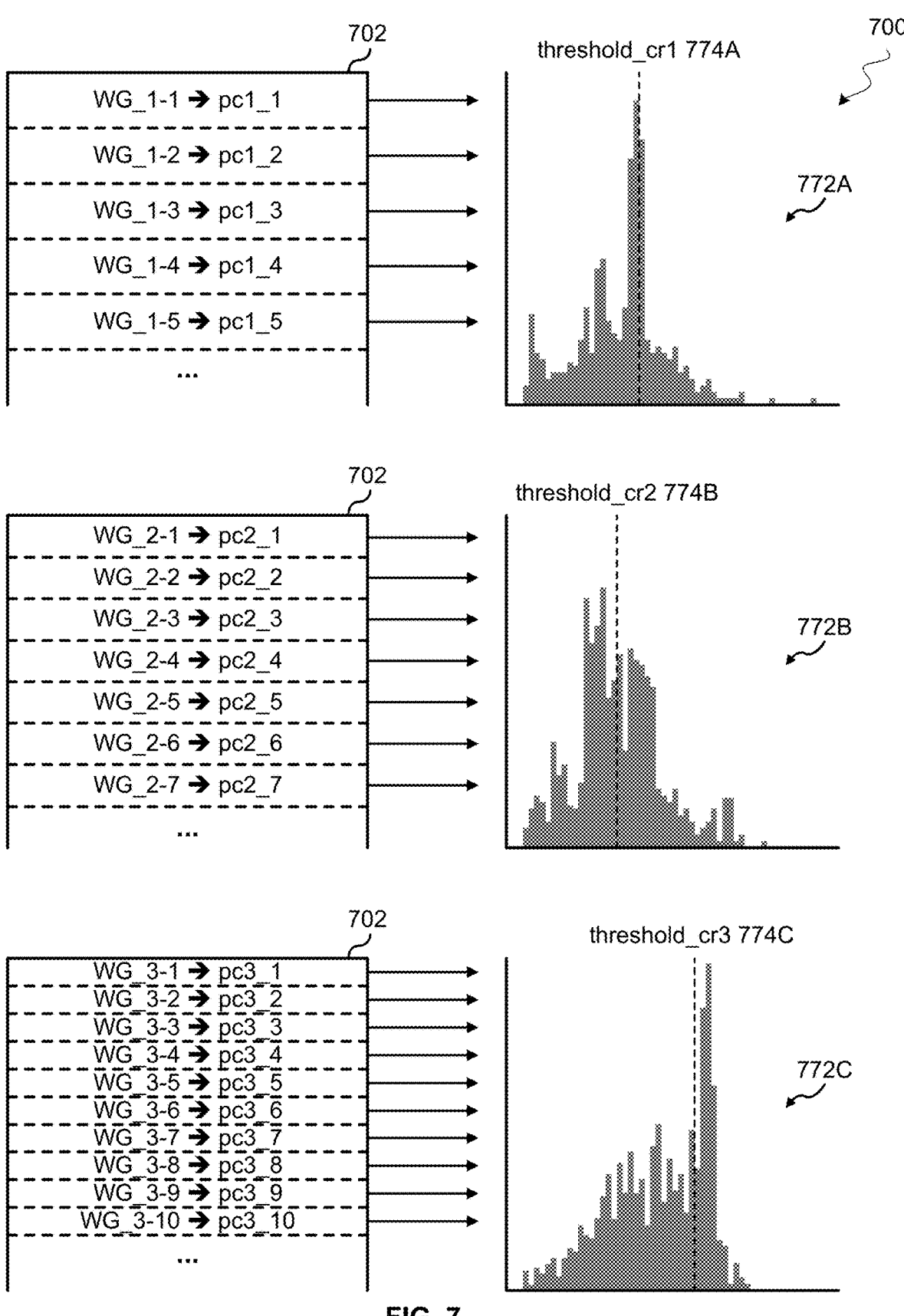
FIG. 7 illustrates another example of a technique to apply more than two compression ratios to a weight tensor.

FIG. 7 illustrates a conceptual diagram 700 of another example of a technique to apply more than two compression ratios to a weight tensor. The compression technique shown in FIG. 7 can provide greater flexibility in terms of the mixture of compression ratios employed, because the number of rows of a weight group need not be a multiple of the number of rows in the weight subgroups. In the example of FIG. 7, three compression ratios cr1, cr2, and cr3 (e.g., 16:4, 12:4, and 8:4) are considered, but it should be noted that any number of valid compression ratios can be used. The uncompressed weight tensor 702 is first divided into multiple weight groups WG_1-1 to WG_1-5 and so on according to compression ratio cr1 (e.g., into sixteen rows of weight values each). For each of the weight groups, a pruning cost for compressing the weight group according to compression ratio cr1 is determined. For example, weight group WG_1-1 may have a pruning cost of pc1_1, weight group WG_1-2 may have a pruning cost of pc1_2, weight group WG_1-3 may have a pruning cost of pc1_3, and so on. A pruning cost distribution 772A of the row groups for the corresponding compression ratio cr1 is then generated, and a cost threshold 774A (indicated as threshold_cr1) is selected for the corresponding compression ratio cr1 according to techniques similar to those described above.

Second, the same uncompressed weight tensor 702 is divided into multiple weight groups WG_2-1 to WG_2-7 and so on according to compression ratio cr2 (e.g., into twelve rows of weight values each). For each of the weight groups, a pruning cost for compressing the weight group according to compression ratio cr2 is determined. For example, weight group WG_2-1 may have a pruning cost of pc2_1, weight group WG_2-2 may have a pruning cost of pc2 2, weight group WG_2-3 may have a pruning cost of pc2_3, and so on. A pruning cost distribution 772B of the row groups for the corresponding compression ratio cr2 is then generated, and a cost threshold 774B (indicated as threshold_cr2) is selected for the corresponding compression ratio cr2.

Finally, the uncompressed weight tensor 702 is divided into multiple weight groups WG_3-1 to WG_3-10 and so on according to compression ratio cr3 (e.g., into eight rows of weight values each). For each of the weight groups, a pruning cost for compressing the weight group according to compression ratio cr3 is determined. For example, weight group WG_3-1 may have a pruning cost of pc3_1, weight group WG_3-2 may have a pruning cost of pc3 2, weight group WG_3-3 may have a pruning cost of pc3_3, and so on. A pruning cost distribution 772C of the row groups for the corresponding compression ratio cr3 is then generated, and a cost threshold 774C (indicated as threshold cr3) is selected for the corresponding compression ratio cr3.

Figure 8:
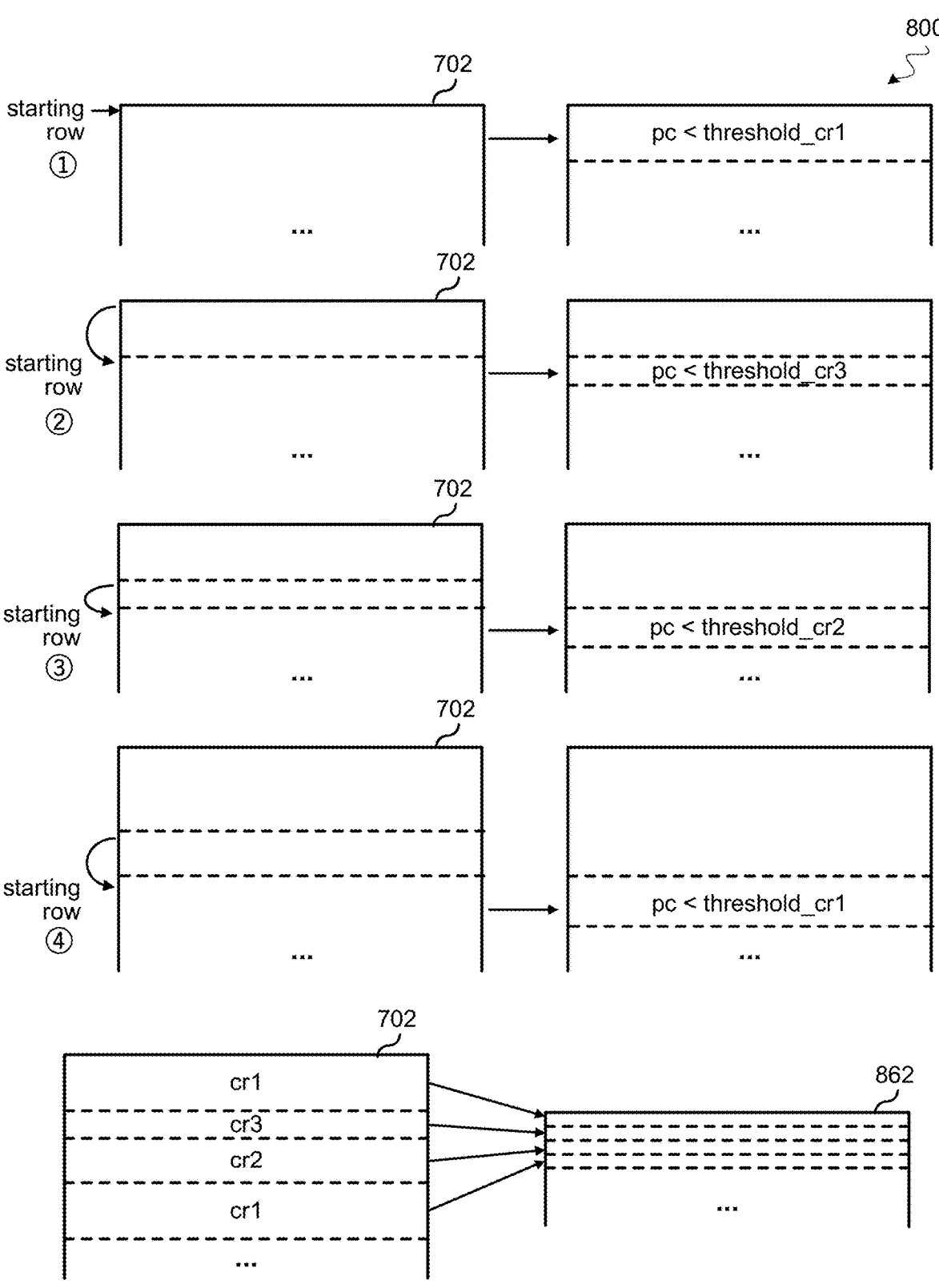
FIG. 8 illustrates another example of compressing a weight tensor using more than two compression ratios.

FIG. 8 illustrates a conceptual diagram 800 of an example of a series of iterations to compress a weight tensor using more than two compression ratios. Continuing with the example from FIG. 7, having generated the pruning cost distributions 772A-772C for the three compression ratios cr1, cr2, and cr3, and then selecting threshold_cr1 774A, threshold_cr2 774B, and threshold cr3 774C, the weight tensor 702 can be compressed into compressed weight tensor 862 as follows.

Initially, the first row of the uncompressed weight tensor 702 is set as the starting row. During iteration ①, starting with the highest compression ratio, a determination is made as to what is the highest compression ratio that satisfies the corresponding cost threshold for a set of sequential rows beginning at the starting row. Hence, a determination is first made as to whether the pruning cost according to compression ratio cr1 (e.g., 16:4) for the first sixteen rows of weight tensor 702 is below threshold_cr1 774A. If not, a determination is then made as to whether the pruning cost according to compression ratio cr2 (e.g., 12:4) for the first twelve rows of weight tensor 702 is below threshold_cr2 774B. If not, a determination is again made as to whether the pruning cost according to compression ratio cr3 (e.g., 8:4) for the first eight rows of weight tensor 702 is below threshold cr3 774C. In the example of FIG. 8, the pruning cost according to compression ratio cr1 (e.g., 16:4) for the first sixteen rows of weight tensor 702 is below threshold_cr1 774A, and hence the first sixteen rows are compressed according to compression ratio cr1 (e.g., 16:4). The next row following the first sixteen sequential rows determined to be compressed using compression ratio cr1 is then set as the starting row for the next iteration.

The process repeats for the next iteration. During iteration ②, a determination is made as to which compression ratio is the highest compression ratio that satisfies the corresponding cost threshold for a set of sequential rows beginning with the starting row (set as the $17^{th}$ row in iteration ②). In the example of FIG. 8, the highest compression ratio that satisfies the corresponding cost threshold for the next set of sequential rows is compression ratio cr3 (e.g., 8:4), and hence the $17^{th}$ to $24^{th}$ rows are compressed according to compression ratio cr3 (e.g., 8:4). The next row ($25^{th}$ row) is then set as the starting row for the next iteration.

During iteration ③, a determination is made as to which compression ratio is the highest compression ratio that satisfies the corresponding cost threshold for a set of sequential rows beginning with the starting row (set as the $25^{th}$ row in iteration ③). In the example of FIG. 8, the highest compression ratio that satisfies the corresponding cost threshold for the next set of sequential rows is compression ratio cr2 (e.g., 12:4), and hence the $25^{th}$ to $36^{th}$ rows are compressed according to compression ratio cr2 (e.g., 12:4). The next row ($37^{th}$ row) is then set as the starting row for the next iteration.

During iteration ④, a determination is made as to which compression ratio is the highest compression ratio that satisfies the corresponding cost threshold for a set of sequential rows beginning with the starting row (set as the $37^{th}$ row in iteration ④). In the example of FIG. 8, the highest compression ratio that satisfies the corresponding cost threshold for the next set of sequential rows is compression ratio cr1 (e.g., 16:4), and hence the $37^{th}$ to $52^{h}$ rows are compressed according to compression ratio cr1 (e.g., 16:4). The next row ($53^{rd}$ row) is then set as the starting row for the next iteration, and the process is repeated for the remaining rows of weight tensor 702 to generate compressed weight tensor 862.

If a set of sequential rows is encountered that do not meet the cost threshold of any of the compression ratios, then one or more of the sequential rows can be skipped over and the following row can be set as the next starting row to allow the process to continue. The skipped rows can remain uncompressed in compressed weight tensor 862. A process similar to those describe above can be performed to determine whether a sparse neural network model retrained with compressed weight tensor 862 satisfies a network accuracy target, and whether to make any adjustments to threshold_cr1 774A, threshold_cr2 774B and/or threshold_cr2 774C.

Thus far, the examples described have applied compression ratios to weight groups that are in the form of row groups of weight values. In other implementations, a weight group can take on other granularities. For example, in some implementations, a weight group can be a layer of a neural network model, and the compression ratios used can be determined at the layer level such that different layers are compressed with different compression ratios. In some implementations, a weight group may correspond to a section of a two-dimensional weight tensor that does not span the entire column width of the weight tensor.

In some implementations, depending on the hardware executing the sparse neural network model with the compressed weight tensor, mixing compression ratios within a matrix multiplication operation may require non-rectangular input feature map tensor stored in memory to flow into the systolic array. This may cause additional data movement operations when writing the output tensor into memory. As such, in some implementations, the compressed weight tensor can be rearranged such that weight groups that have been compressed with the same compression ratio are grouped together to reduce the additional data movement operations that may otherwise be needed when taking into account the hardware executing the sparse neural network model.

Figure 9:
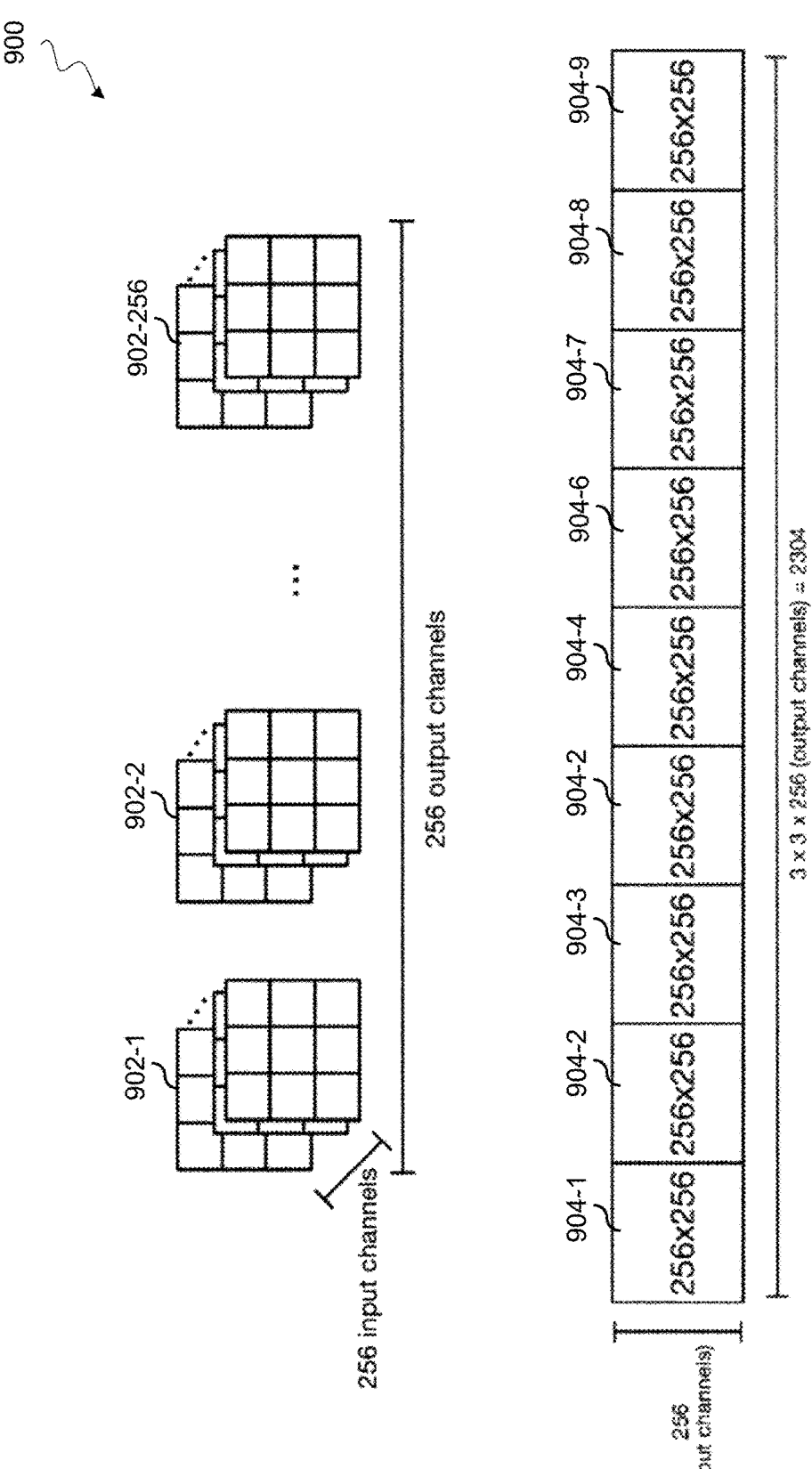
FIG. 9 illustrates an example of flattening a multi-dimensional weight tensor.

FIG. 9 illustrates a conceptual diagram 900 of an example of flattening a multi-dimensional weight tensor into a two-dimensional weight tensor. The weight tensor shown in FIG. 9 may correspond to a convolution layer such as Conv2d with 256 input channels, 256 output channels, and a 3×3 filter size, which can be represented using a four-dimensional weight matrix with dimensionality of 256×256×3×3. By way of example, each output channel 902-1 to 902-256 is generated from 256 input channels of a 3×3 filter weight matrix. To flatten this four-dimensional weight matrix, nine 256×256 weight matrices 904-1 to 904-9 can be generated, in which each 256×256 weight matrix is composed of weight values from one index of the 3×3 filter taken from each of the filters. For instance, the 256×256 weight matrix 904-1 can be composed of the upper left corner weight value taken from each of the 3×3 filters, the 256×256 weight matric 904-2 can be composed of the upper middle weight value taken from each of the 3×3 filters, and so on. Having flattened the four-dimensional weight matrix into a two-dimensional weight matrix, the compression techniques as described herein can be applied to the flattened weight matrix to generate a compressed weight tensor for a sparse neural network model.

FIG. 10 illustrates a flow diagram of an example of a process 1000 for generating a sparse neural network model, according to some implementations. Process 1000 may begin at block 1002 by obtaining a weight tensor of a neural network model. The weight tensor can be part of a pre-trained neural network model, and the weight tensor can be a two-dimensional weight tensor or weight matrix having weight values arranged in rows and columns. In some implementations, the two-dimension weight tensor can be obtained by flattening weight matrices of a multi-layer neural network model.

At block 1004, the weight tensor obtained at block 1002 is divided into multiple weight groups. In some implementations, each weight group can be a row group containing a set of rows of weight values of the weight tensor. The number of rows in the row group can be based on a first compression ratio that compresses a number of original rows of weight values into a reduced number of rows. For example, the number of rows in each row group can be the number of original rows of weight values that the compression ratio operates on. In some implementations, the weight group may have other granularities (e.g., group of partial rows). In some instances, weight groups belonging to the same layer of a neural network model can also be constrained to use the same compression ratio, while different layers may use different compression ratios.

At block 1006, a pruning cost of compressing the weight values of each weight group according to the first compression ratio is determined. Compressing a weight group may include replacing a number of smallest magnitude weight values in the weight group with zeros. The pruning cost of a weight group can be determined, for example, by calculating an average of absolute values of the smallest magnitude weight values being replaced with zeros.

At block 1008, a pruning cost distribution of the weight groups is generated. The pruning cost distribution can be a histogram of the counts of the various pruning costs, and the total number of counts in the histogram can be equal to the number of weight groups. It should be noted that the pruning cost distribution is associated with the first compression ratio, and that different compression ratios may generate a different pruning cost distribution.

At block 1010, a cost threshold is selected from the pruning cost distribution. The cost threshold can be selected arbitrarily, or be selected according to a statistical criterion. For example, the cost threshold can be selected as the mean of the pruning cost distribution, the median of the pruning cost distribution, or as one or more standard deviations above or below the mean, etc.

At block 1012, a first set of weight groups having a pruning cost below the cost threshold are compressed according to the first compression ratio to generate the sparse neural network model. A weight group can be compressed by replacing the set of smallest magnitude weight values in the weight group with zeros such that those values being replaced need not be stored. Metadata tags for each non-zero weight value remaining in the compressed first set of weight groups indicating a position of the non-zero weight value can be generated and stored with the compressed first set of weight groups to ensure functional correctness in the neural network computation.

At block 1014, a second set of weight groups having a pruning cost at or above the cost threshold are compressed according to a second compression ratio that is less than the first compression ratio. For example, if the first compression ratio is 16:4, then the second compression ratio can be, 8:4, or 4:4, etc. Metadata tags for each non-zero weight value remaining in the compressed second set of weight groups indicating a position of the non-zero weight value can be generated and stored with the compressed second set of weight groups.

In some implementations, compressing the second set of weight groups may include dividing remaining weight groups that are not part of the first set of weight groups into weight subgroups, determining a subgroup pruning cost of compressing the weight values of each weight subgroup according to the second compression ratio, and generating a subgroup pruning cost distribution of the weight subgroups. A subgroup cost threshold can be selected from the subgroup pruning cost distribution, and a set of weight subgroups having a subgroup pruning cost below the subgroup cost threshold can be compressed according to the second compression ratio. Remaining weight groups or subgroups that does not meet the cost threshold condition may remain uncompressed in the compressed weight tensor. In some implementations, the weight groups can be rearranged in the compressed weight tensor according to their compression ratio, for example, by keeping weight groups being compressed with the same compression ratio together.

At block 1016, a neural network using the sparse neural network model derived from the compressed weight tensor generated at blocks 1012-1014 can be retrained using standard techniques while keeping the replaced weight values at a zero value. This may include tuning any hyper parameters during training. Then at block 1018, a determination is made as to whether the sparse neural network model satisfies a network accuracy target. If the sparse neural network model derived from the compressed weight tensor satisfies the network accuracy target, then process 1000 may end. If it is determined that the sparse neural network model fails to satisfy the network accuracy target, process 1000 may return to block 1010 to select a lower cost threshold from the cost threshold distribution and to continue the process to generate a second sparse neural network model.

Figure 11:
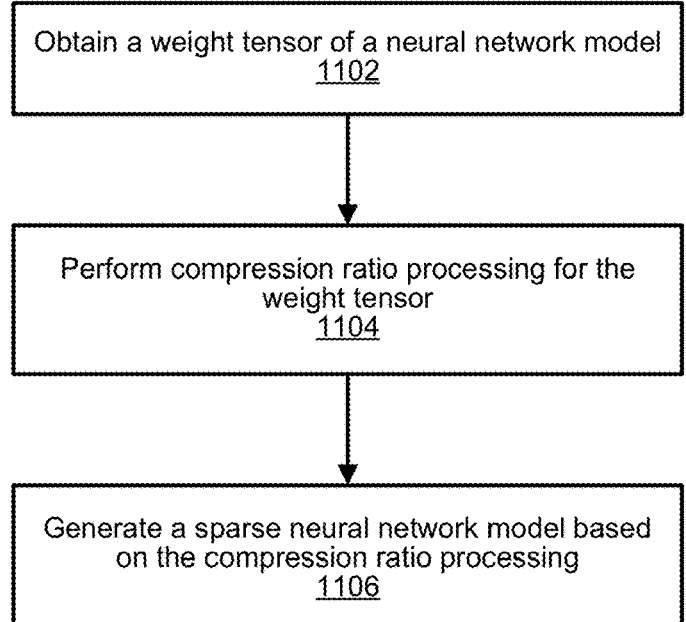
FIG. 11 illustrates a flow diagram of another example of a process for generating a sparse neural network model.

FIG. 11 illustrates a flow diagram of another example of a process 1100 for generating a sparse neural network model, according to some implementations. Process 1100 may begin at block 1102 by obtaining a weight tensor of a neural network model. The weight tensor can be a two-dimensional weight tensor having weight values arranged in rows and columns, and the weight tensor can be obtained by flattening a multi-dimensional weight tensor.

At block 1104, compression ratio processing for the weight tensor is performed for one or more compression ratios. In some implementations, the compression ratio processing may correspond to blocks 1004-1010 of process 1000. In some implementations, the compression ratio processing can be performed for multiple compression ratios being considered, and may correspond to process 1200 described further below.

At block 1106, a sparse neural network model is generated based on the compression ratio processing performed at block 1104. In some implementations, the sparse neural network model generation may correspond to blocks 1012-1014 of process 1000. In some implementations, the sparse neural network model generation may correspond to process 1300 described further below.

Figure 12:
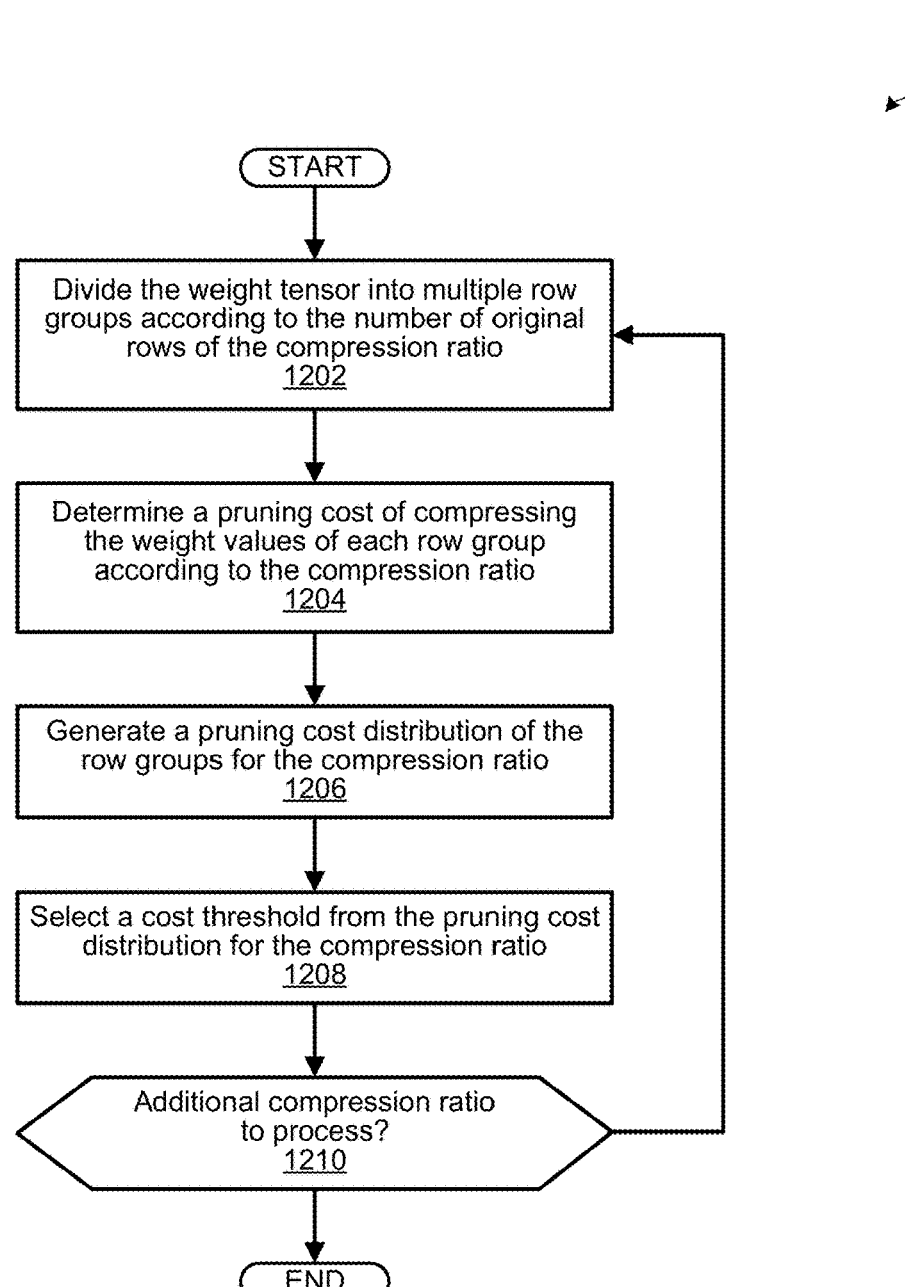
FIG. 12 illustrates a flow diagram of an example of a process for processing compression ratios for a weight tensor.

FIG. 12 illustrates a flow diagram of an example of a process 1200 for processing compression ratios for a weight tensor, according to some implementations. Process 1200 can be performed for one or more compression ratios being considered for compressing the weight tensor. By way of example, the compression ratios being considered may include N:4 compression ratios with N being the number of original rows of weight values and 4 being the reduced number of rows after compression. For instance, process 1200 can be performed for compression ratios of 16:4, 12:4, 8:4, etc. In some implementations, N can be an integer 16, and the reduced number of rows can be an integer 4.

Process 1200 may begin at block 1202 by dividing the weight tensor into multiple row groups according to the number of original rows of the compression ratio being processed. For example, if the compression ratio being processed is 16:4, the weight tensor can be divided into row groups each containing sixteen rows; if the compression ratio being processed is 12:4, the weight tensor can be divided into row groups each containing twelve rows.

At block 1204, a pruning cost of compressing the weight values of each row group according to the compression ratio being processed is determined. By way of example, compressing the weight values of a row group may include removing from each column of the row group a set of the smallest magnitude weight values from the column. The pruning cost of a row group can be determined by calculating an average of absolute values of the removed weight values.

At block 1206, the pruning cost distribution of the row groups for the compression ratio being processed is generated, and at block 1208 a cost threshold is selected from the pruning cost distribution for the compression ratio according to the techniques disclosed herein. At block 1210, a determination is made as to whether any addition compression ratio is to be processed. If there are any additional compression ratio to be processed, process 1200 returns to block 1202 to process the next compression ratio for the weight tensor. If there are no more compression ratio to process, process 1200 may end.

FIG. 13 illustrates a flow diagram of an example of a process 1300 for generating a sparse neural network model based on the compression ratio processing of process 1200, according to some implementations. Process 1300 may begin at block 1302 by setting the first row of the original weight tensor as a starting row, and iteratively performing a compression operation for the rows of the weight tensor in subsequent blocks.

At block 1304, a determination is made as to which compression ratio processed in process 1200 is the highest compression ratio that satisfies the corresponding cost threshold for a set of sequential rows beginning at the starting row. This is performed by comparing the pruning cost of the set of sequential rows with the cost threshold selected for the compression ratio, and determining whether the pruning cost is below the selected cost threshold for the compression ratio.

At block 1306, the set of sequential rows beginning from the starting row are compressed according to the compression ratio determined at block 1304. The compression can be carried out according to the techniques described herein, and metadata indicating the position of the remaining weight values after compression can be generated and stored.

At block 1308, a determination is made as to whether there are additional rows of the weight tensor to process. If the last row of the weight tensor has been processed, then process 1300 may end and the compressed weight tensor can be retrained for accuracy comparison. If there are addition rows of the weight tensor to process, then process 1300 proceeds to block 1310 to set the next row following the set of sequential rows as the starting row for the next iteration, and process 1300 returns to block 1304 to process the next set of sequential rows.

Any of processes 1000, 1100, 1200, and 1300 can be implemented, for example, using software such as code stored in a computer readable storage medium, and can be executed by one or more processors of a computing system. In some implementations, any of processes 1000, 1100, 1200, and 1300, or a portion thereof, can be performed, for example, by a compiler that interprets programming code describing a neural network model, and translates the programming code into machine instructions for execution on hardware. In some implementations, any of processes 1000, 1100, 1200, and 1300, or a portion thereof, can be implemented on a computer-readable medium that is executable by a processor of a computing system to compile the programming code of a neural network model for loading onto an integrated circuit device such as a neural network processor for execution.

Figure 14:
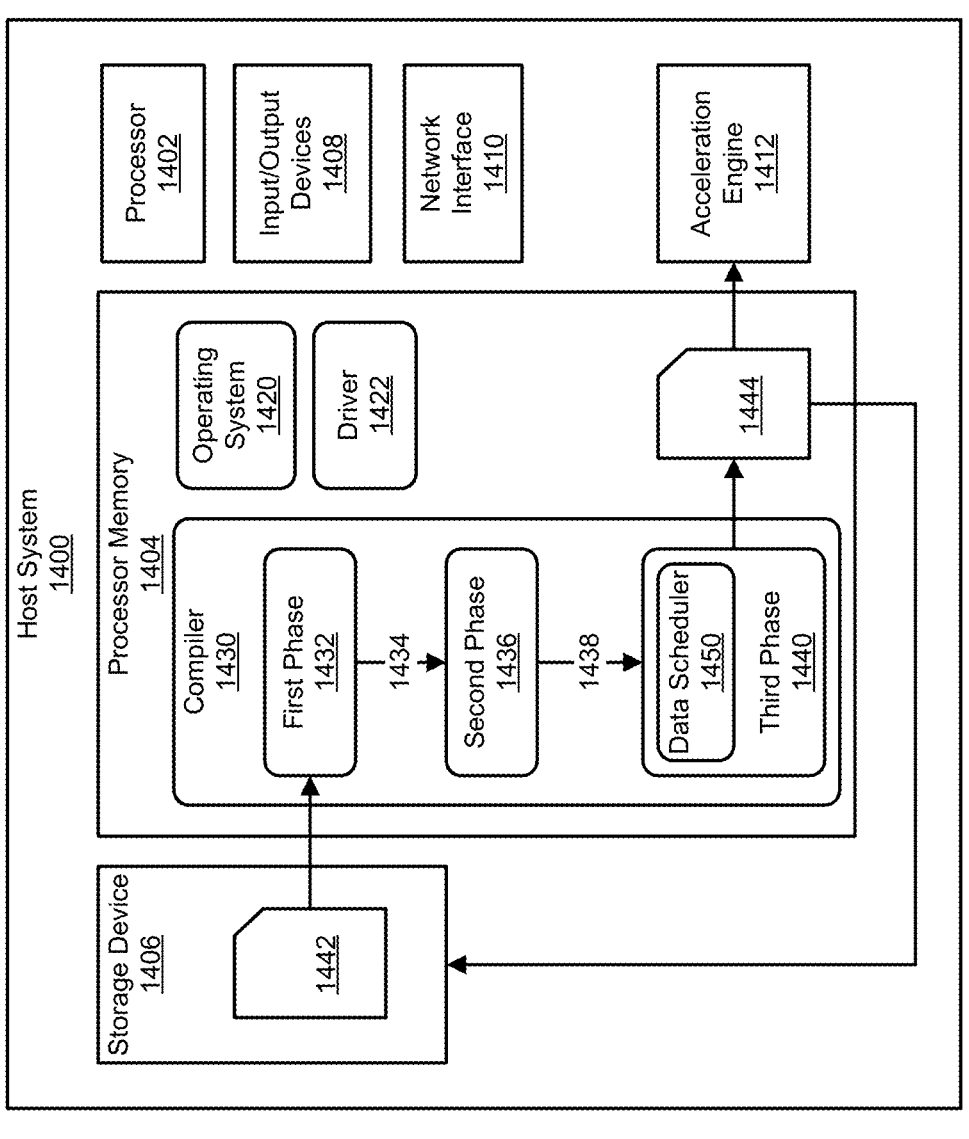
FIG. 14 illustrates a block diagram of an example of a compiler in a host system.

FIG. 14 includes a block diagram illustrating an example of a host system 1400 on which a compiler 1430, such as is described herein, can run. The illustrated host system 1400 is an example of a computing device, and includes a processor 1402, a processor memory 1404, at least one storage device 1406, various Input/Output (I/O) devices 4108, and at least one network interface 1410. In the example of FIG. 14, the host system 1400 also includes an acceleration engine 1412, which is an integrated circuit device that can accelerate certain operations or computations performed by the host system 1400. In various examples, the host system 1400 can be implemented as a server in a data center, a desktop computer, a laptop computer, a tablet computer, or a smartphone, among other examples. In some examples, operations or components discussed below as being performed or included in the host system 1400 can be performed or included in other computer devices. For example, the compiler 1430 can execute on the host system 1400 while the acceleration engine 1412 is located at a different host system.

The processor 1402 is an integrated circuit device that can execute program code, in the form of instructions. The program code can be for various software applications or tools, such as an operating system 1420 or the illustrated compiler 1430. While the processor 1402 is executing a program, the instructions for the program can be stored in the processor memory 1404. The instructions can also be stored elsewhere, such as on the storage device 1406, and can be loaded into the processor memory 1404 when needed by the processor 1402. The processor 1402 can also use the processor memory 1404 for temporary storage of other data on which the processor 1402 is operating. In various examples, the processor memory 1404 is a volatile memory type, such as a type of Random Access Memory, though non-volatile memory types can, alternatively or additionally, be used for the processor memory 1404.

The storage device 1406 is an example of a device that can include non-volatile memory. For example, the storage device 1406 can be a magnetic disk drive, a solid state drive, or an optical drive, among other examples. The storage device 1406 can further be non-transitory, such that program code and other data stored on the storage device 1406 remains present when the storage device 1406 is not powered on.

The storage device 1406 is one example of a peripheral device, which are components that can be coupled to the host system 1400 to add functionality to the host system 1400. Other examples of peripheral devices include the Input/Output devices 1408 and the network interface 1410. The Input/Output devices 1408 can include user input and output devices, such as keyboards, mice, touch screens, microphones, display screens, speakers, printers, and scanners, among other examples. The network interface 1410, which can be implemented using a network interface card, can provide access to one or more networks. The network interface 1410 can include, for example, a physical port for connecting a network cable and/or wireless antennas for communicating with Wi-Fi and/or cellular networks. The network interface 1410 can also be described as an I/O device.

The acceleration engine 1412 is also another type of peripheral device or I/O device. The acceleration engine 1412 is a device that is purpose-built to perform certain operations that can be performed by the processor 1402, but can be performed faster by the acceleration engine 1412. For example, the acceleration engine 1412 can be a neural network accelerator, and, as such, may be able to perform the large scale, parallel computations of a neural network more efficiently than when the computations are performed by the processor 1402. As another example, the acceleration engine 1412 can be a graphics processing unit (GPU), and may be optimized to perform the computations needed for graphics rendering. Other examples of devices that can be implemented by the acceleration engine 1412 include cryptographic accelerators, compression and decompression accelerators, 3-D accelerators, regular expression accelerators, security accelerators, and others.

In various examples, the acceleration engine 1412 can execute program code to perform certain operations. For example, when the acceleration engine 1412 is a neural network accelerator, the acceleration engine 1412 can be programmed to execute a particular neural network, such as one that performs image recognition or one that performs machine translation. As a further example, to support the execution of a neural network, the acceleration engine 1412 can be programed to perform operations such as copying data for the neural network from processor memory 1404 (for example) into the acceleration engine 1412, copying input data for the neural network from processor memory 1404 into the acceleration engine 1412, and/or copying results from the acceleration engine 1412 into the processor memory 1404, among other examples.

To generate program code for the acceleration engine 1412, in various examples, the host system 1400 can execute the compiler 1430. Compilers, in general, are software programs that translate program code written in a human-readable language into a format (e.g., machine instructions) that can be read and processed by an integrated circuit device. In the example of FIG. 14, the acceleration engine 1412 is a neural network accelerator and the compiler 1430 is for compiling a neural network description into instructions to be executed by the acceleration engine 1412. When the acceleration engine 1412 implements a different type of accelerator, another compiler can be used.

The compiler 1430 can be activated, for example, when the operating system 1420 receives keyboard, mouse, touchscreen, voice commands, or other inputs from the Input/Output devices 1408. The inputs can further include parameters for the compiler 1430, such as the input code 1442 to compile and configuration options for the compilation process. Once the compiler 1430 is activated, the processor 1402 can load the instructions for the compiler 1430 into the processor memory 1404, and can execute the instructions.

In the example of FIG. 14, the compiler 1430 includes a first stage 1432, a second stage 1436, and a third stage 1440, which each perform different operations to produce compiled code 1444. In other examples, the compiler 1430 can combine the operations of the first stage 1432, second stage 1436, and/or third stage 1440 into fewer stages, or can divide the operations of one of the stages into multiple stages.

The first stage 1432 can receive and process input code 1442. The input code 1442 can describe a program in a high-level programming language, such as Java, C++, or Tensorflow, among many other examples. The input code 1442 can describe, for example, steps to perform image recognition, speech recognition, machine translation, or other operations. The input code 1442 can be obtained, for example, from the storage device 1406. Alternatively, though not illustrated here, the input code 1442 may be located in the processor memory 1404 or can be obtained from a network location, using the network interface 1410. Processing of the input code 1442 can include sorting the operations described in the input code 1442 into layers, where the outputs of one layer provide the inputs to a next layer. Processing can also include identifying steps to be performed by the processor 1402, rather than by the acceleration engine 1412. For example, the processor 1402, through the execution of a driver 1422, may need to perform steps such as configuring Direct Memory Access (DMA) descriptors for moving data into or out of the acceleration engine 1412, among other examples.

The output 1434 of the first stage 1432 can be organized, for example, in the layers, nodes, and connections between nodes of a neural network. The second stage 1436 can perform intermediate processing on this output 1434. For example, the operations performed in any one layer, or at any one node in a layer, may be too many for the acceleration engine 1412 to perform at the same time. The acceleration engine 1412 may, for example, have a limited amount of locale storage space for the data needed for a computation, or the computations may be more than the acceleration engine 1412 can perform at one time. In this example, the first stage 1432 can break the operations of the layer or node down into smaller operations, which can fit into the acceleration engine's local memory and/or can fit into the computing capacity of the acceleration engine 1412. Processing of the output 1434 of the first stage 1432 can include other steps, such as scheduling, or determining the order in which the acceleration engine 1412 and/or processor 1402 will perform operations, among other examples.

In various examples, the output 1438 of the second stage 1436 includes the various steps to be performed by components of the acceleration engine 1412, in the order that the steps are to be performed. The output 1438 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1440 can operate on the output 1438 of the second stage 1436, and perform various steps before producing the instructions that are to be executed by the acceleration engine 1412. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 1440 can include a data scheduler 1450 to determine the order in which instructions are executed by the acceleration engine 1412.

The output of the third stage 1440 is compiled code 1444, which may include machine instructions in binary format. In some examples, the compiled code 1444 can be stored in the processor memory 1404. Alternatively or additionally, the compiled code 1444 can be copied to the storage device 1406 or to a network location. As noted above, the acceleration engine 1412 may be located at a different host system, in which case the compiled code 1444 can be sent over the network interface 1410 to the other host system.

In the example of FIG. 14, the host system 1400 can be executing a driver 1422, which can also be referred to as a device driver or runtime driver, that manages the acceleration engine 1412. The driver 1422 can provide an interface between applications executing on the host system 1400 (or on another host system) and the acceleration engine 1412. For example, the driver 1422 can provide an Application Program Interface (API) that defines functions for feeding input data to the acceleration engine 1412 and defining the operation to perform on the input data. In this and other examples, the driver 1422 can configure the acceleration engine 1412 to perform the operation. For example, the driver 1422 can identify a neural network that the acceleration engine 1412 is to execute, as well as the location in the processor memory 104 or on the storage device 1406 where the compiled code 1444 for the neural network is located. The driver 1422 can further load into the acceleration engine 1412 or cause the acceleration engine 1412 to load the compiled code 1444, can load or cause the acceleration engine 1412 to load the input data on which the neural network is to operate, and/or can cause the acceleration engine 1412 to being executing on the input data. Once the acceleration engine 1412 has finished, the acceleration engine 1412 can notify the driver 1422, and the driver 1422 can deliver a result back to the application that requested the result.

Figure 15:
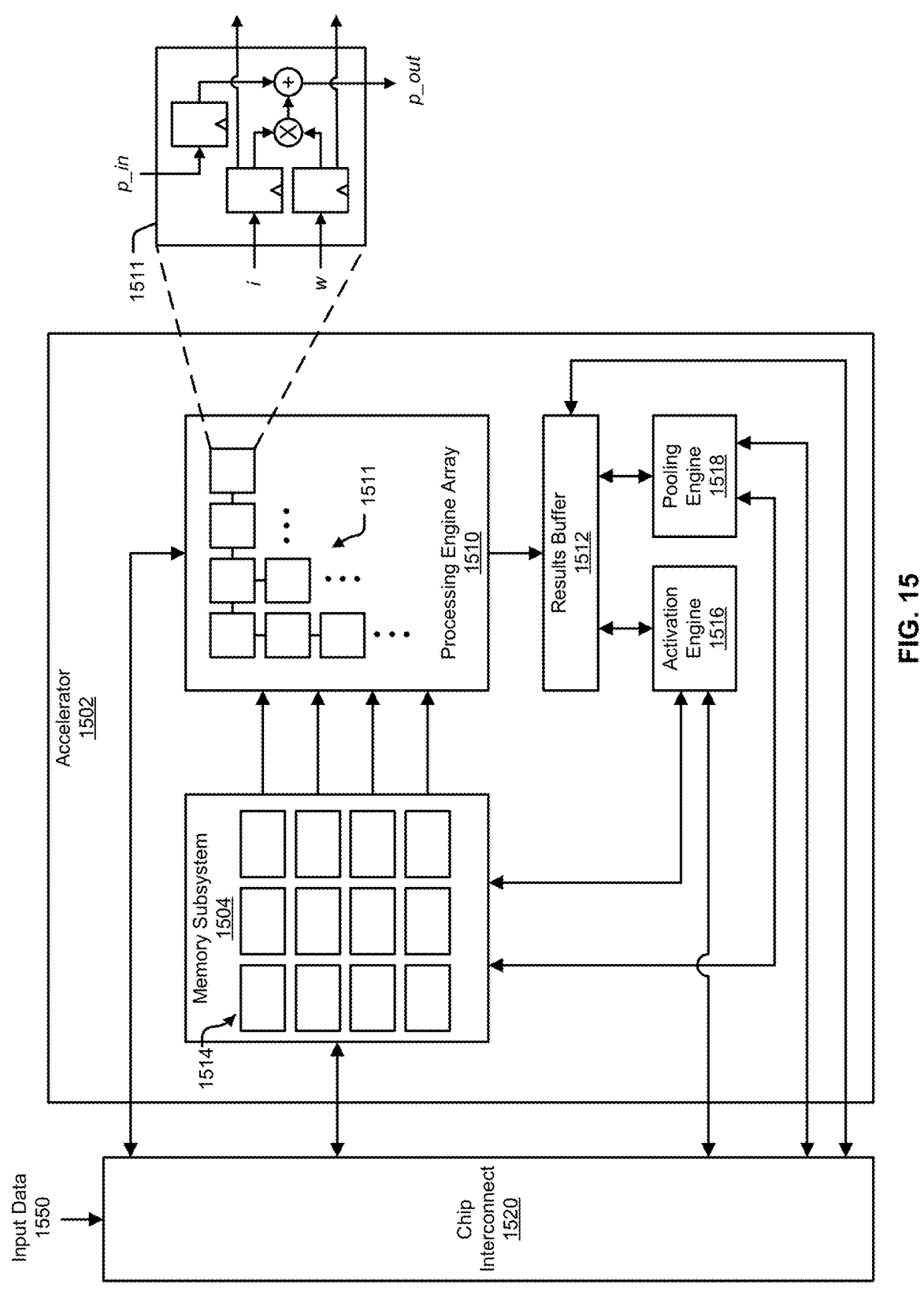
FIG. 15 illustrates a block diagram of an example of an integrated circuit device.

FIG. 15 is a block diagram illustrating an example of an integrated circuit device that can include an accelerator 1502. In various examples, the accelerator 1502, for a set of input data (e.g., input data 1550), can execute computations using a processing engine array 1510 (e.g., a systolic array), an activation engine 1516, and/or a pooling engine 1518. In some examples, the example accelerator 1502 may be an integrated circuit component of a processor, such as a neural network processor. The processor may have other integrated circuit components, including additional accelerator engines.

In various implementations, the memory subsystem 1504 can include multiple memory banks 1514. In these implementations, each memory bank 1514 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1514. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1504 can permit simultaneous access to the read or write channels of multiple memory banks. As another example, the memory subsystem 1504 can include arbitration logic such that arbitration between, for example, the outputs of multiple memory banks 1514 can result in more than one memory bank's output being used. In these and other examples, though globally managed by the memory subsystem 1504, each memory bank can be operated independently of any other.

Having the memory banks 1514 be independently accessible can increase the efficiency of the accelerator 1502. For example, values can be simultaneously read and provided to each row of the processing engine array 1510, so that the entire processing engine array 1510 can be in use in one clock cycle. As another example, the memory banks 1514 can be read at the same time that results computed by the processing engine array 1510 are written to the memory subsystem 1504. In contrast, a single memory may be able to service only one read or write at a time. With a single memory, multiple clock cycles can be required, for example, to read input data for each row of the processing engine array 1510 before the processing engine array 1510 can be started.

In various implementations, the memory subsystem 1504 can be configured to simultaneously service multiple clients, including the processing engine array 1510, the activation engine 1516, the pooling engine 1518, and any external clients that access the memory subsystem 1504 over a communication fabric 1520. In some implementations, being able to service multiple clients can mean that the memory subsystem 1504 has at least as many memory banks as there are clients. In some cases, each row of the processing engine array 1510 can count as a separate client. In some cases, each column of the processing engine array 1510 can output a result, such that each column can count as a separate write client. In some cases, output from the processing engine array 1510 can be written into the memory banks 1514 that can then subsequently provide input data for the processing engine array 1510. As another example, the activation engine 1516 and the pooling engine 1518 can include multiple execution channels, each of which can be separate memory clients. The memory banks 1514 can be implemented, for example, using static random access memory (SRAM).

In various implementations, the memory subsystem 1504 can include control logic. The control logic can, for example, keep track of the address spaces of each of the memory banks 1514, identify memory banks 1514 to read from or write to, and/or move data between the memory banks 1514. In some implementations, memory banks 1514 can be hardwired to particular clients. For example, a set of memory banks 1514 can be hardwired to provide values to the rows of the processing engine array 1510, with one memory bank servicing each row. As another example, a set of memory banks can be hard wired to receive values from columns of the processing engine array 1510, with one memory bank receiving data for each column.

The processing engine array 1510 is the computation matrix of the example accelerator 1502. The processing engine array 1510 can, for example, execute parallel integration, convolution, correlation, and/or matrix multiplication, among other things. The processing engine array 1510 includes multiple processing engines 1511, arranged in rows and columns, such that results output by one processing engine 1511 can be input directly into another processing engine 1511. Processing engines 1511 that are not on the outside edges of the processing engine array 1510 thus can receive data to operate on from other processing engines 1511, rather than from the memory subsystem 1504.

In various examples, the processing engine array 1510 uses systolic execution, in which data arrives at each processing engine 1511 from different directions at regular intervals. In some examples, input data can flow into the processing engine array 1510 from the left and weight values can be loaded at the top. In some examples weights and input data can flow from the left and partial sums can flow from top to bottom. In these and other examples, a multiply-and-accumulate operation moves through the processing engine array 1510 as a diagonal wave front, with data moving to the right and down across the array. Control signals can be input at the left at the same time as weights, and can flow across and down along with the computation.

In various implementations, the number of columns in the processing engine array 1510 determines the computational capacity of the processing engine array 1510, and the number of rows determines the required memory bandwidth for achieving maximum utilization of the processing engine array 1510. The processing engine array 1510 can have, for example, 64 columns and 428 rows, or some other number of columns and rows.

An example of a processing engine 1511 is illustrated in FIG. 15 in an inset diagram. As illustrated by this example, a processing engine 1511 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1511.

In the illustrated example, an input from above can include a partial sum, p_in, provided either from another processing engine 1511 or from a previous round of computation by the processing engine array 1510. When starting a computation for a new set of input data, the top row of the processing engine array 1510 can receive a fixed value for p_in, such as zero. As illustrated by this example, i and w are multiplied together and the result is summed with p_in to produce a new partial sum, p_out, which can be input into another processing engine 1511. Various other implementations of the processing engine 1511 are possible.

Outputs from the last row in the processing engine array 1510 can be temporarily stored in the results buffer 1512. The results can be intermediate results, which can be written to the memory banks 1514 to be provided to the processing engine array 1510 for additional computation. Alternatively, the results can be final results, which, once written to the memory banks 1514 can be read from the memory subsystem 1504 over the communication fabric 1520, to be output by the system.

In some implementations, the accelerator 1502 includes an activation engine 1516. In these implementations, the activation engine 1516 can combine the results from the processing engine array 1510 into one or more output activations. For example, for a convolutional neural network, convolutions from multiple channels can be summed to produce an output activation for a single channel. In other examples, accumulating results from one or more columns in the processing engine array 1510 may be needed to produce an output activation for a single node in the neural network. In some examples, activation engine 1516 can be bypassed.

In various examples, the activation engine 1516 can include multiple separate execution channels. In these examples, the execution channels can correspond to the columns of the processing engine array 1510, and can perform an operation on the outputs of a column, the result of which can be stored in the memory subsystem 1504. In these examples, the activation engine 1516 may be able to perform between 1 and n parallel computations, where n is equal to the number of columns in the processing engine array 1510. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1502 can include a pooling engine 1518. Pooling is the combining of outputs of the columns of the processing engine array 1510. Combining can include for example, computing a maximum value, a minimum value, an average value, a median value, a summation, a multiplication, or another logical or mathematical combination. In various examples, the pooling engine 1518 can include multiple execution channels that can operating on values from corresponding columns of the processing engine array 1510. In these examples, the pooling engine 1518 may be able to perform between 1 and n parallel computations, where n is equal to the number of columns in the processing engine array 1510. In various examples, execution channels of the pooling engine 1518 can operate in parallel and/or simultaneously. In some examples, the pooling engine 1518 can be bypassed.

Herein, the activation engine 1516 and the pooling engine 1518 may be referred to collectively as execution engines. The processing engine array 1510 is another example of an execution engine. Another example of an execution engine is a Direct Memory Access (DMA) engine, which may be located outside the accelerator 1502.

Input data 1550 can arrive over the communication fabric 1520. The communication fabric 1520 can connect the accelerator 1502 to other components of a processor, such as a DMA engine that can obtain input data 1550 from an Input/Output (I/O) device, a storage drive, or a network interface. The input data 1550 can be, for example one-dimensional data, such as a character string or numerical sequence, or two-dimensional data, such as an array of pixel values for an image or frequency and amplitude values over time for an audio signal. In some examples, the input data 1550 can be three-dimensional, as may be the case with, for example, the situational information used by a self-driving car or virtual reality data. In some implementations, the memory subsystem 1504 can include a separate buffer for the input data 1550. In some implementations, the input data 1550 can be stored in the memory banks 1514 when the accelerator 1502 receives the input data 1550.

In some examples, the accelerator 1502 can implement a neural network processing engine. In these examples, the accelerator 1502, for a set of input data 1550, can execute a neural network to perform a task for which the neural network was trained. Executing a neural network on a set of input data can be referred to as inference or performing inference.

The weights for the neural network can be stored in the memory subsystem 1504, along with input data 1550 on which the neural network will operate. The neural network can also include instructions, which can program the processing engine array 1510 to perform various computations on the weights and the input data. The instructions can also be stored in the memory subsystem 1504, in the memory banks 1514 or in a separate instruction buffer. The processing engine array 1510 can output intermediate results, which represent the outputs of individual layers of the neural network. In some cases, the activation engine 1516 and/or pooling engine 1518 may be enabled for computations called for by certain layers of the neural network. The accelerator 1502 can store the intermediate results in the memory subsystem 1504 for inputting into the processing engine array 1510 to compute results for the next layer of the neural network. The processing engine array 1510 can further output final results from a last layer of the neural network. The final results can be stored in the memory subsystem 1504 and then be copied out to host processor memory or to another location.

Figure 16:
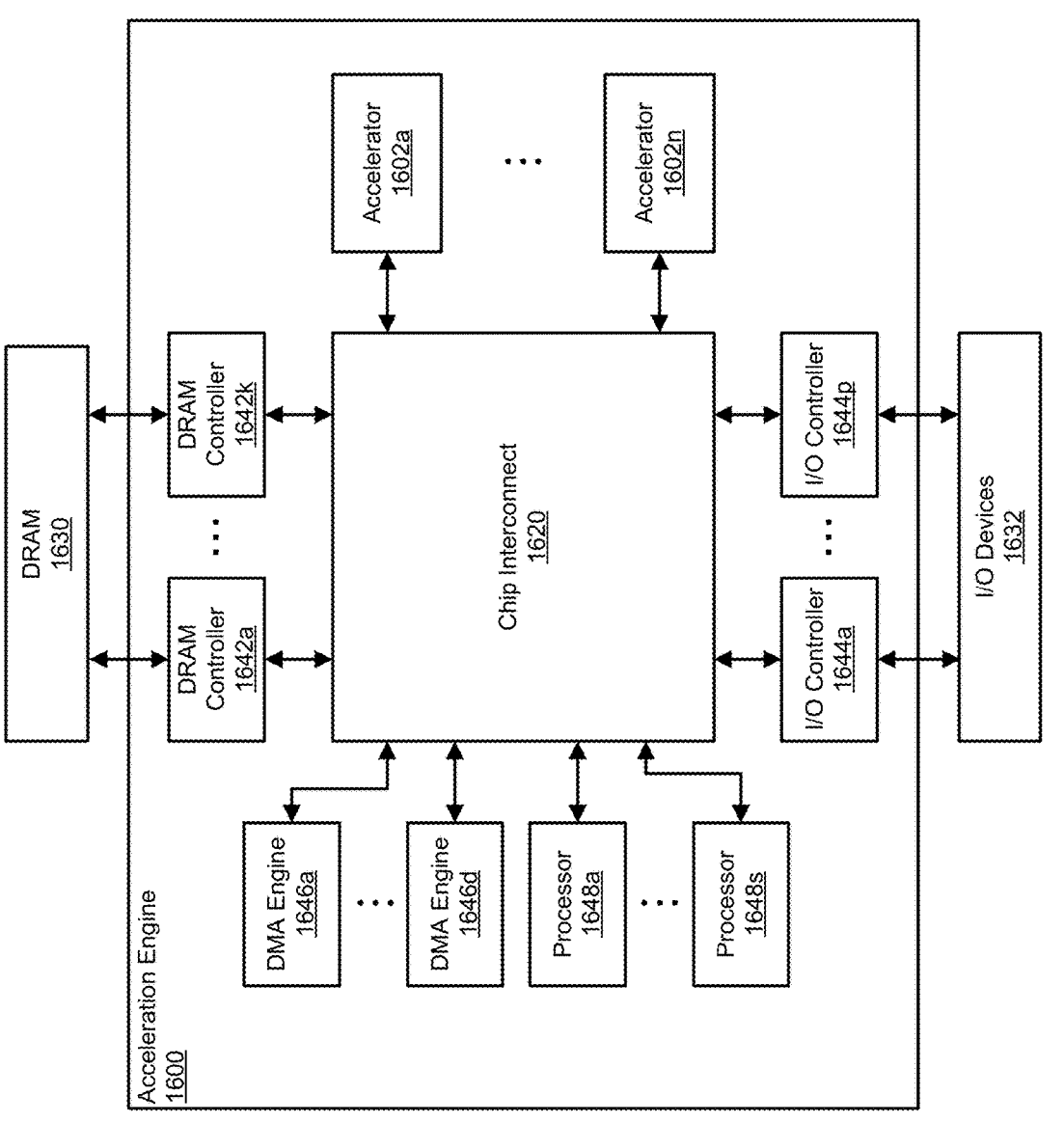
FIG. 16 illustrates a block diagram of an example of an acceleration engine.

FIG. 16 includes a block diagram that illustrates an example of an acceleration engine 1600. The acceleration engine 1600 is an example of an integrated circuit that can include one or more accelerators 1602a-1602n that may be similar to the accelerator illustrated in FIG. 15.

In the example of FIG. 16, the acceleration engine 1600 includes multiple accelerators 1602a-1602n, each of which can perform a set of operations. In various examples, the accelerators 1602a-1602n are for particular types of operations, so that the accelerators 1602a-1602n can perform the operations much faster than when similar operations are performed by a general purpose processor. In various examples, to perform a set of operations, input data on which the operations are to be performed must first be moved into the accelerators 1602a-1602n. Additionally, in some cases, program code is also moved into the accelerators 1602a-1602n, which programs the operations that the accelerators 1602a-1602n will perform on the data. In the illustrated example, the acceleration engine 1600 includes n accelerators 1602a-1602n. Examples of accelerators that can be included in the acceleration engine 1600 include graphics accelerators, floating point accelerators, neural network accelerators, and others. In various examples, the accelerators 1602a-1602n can each be the same (e.g., each of the accelerators 1602a-1602n is a graphics accelerator) or can be different (e.g., the accelerators 1602a-1602n include a graphics accelerator, a floating point accelerator, and neural network accelerator).

The example acceleration engine 1600 further includes DRAM controllers 1642a-1642k for communicating with an external memory. The external memory is implemented, in this example, using DRAM 1630. In the illustrated example, the acceleration engine 1600 includes k DRAM controllers 1642a-1642k, each of which may be able to communicate with an independent set of banks of DRAM. In other examples, other types of RAM technology can be used for the external memory. The DRAM controllers 1642a-1642k can also be referred to as memory controllers.

In various examples, input data and/or program code for the accelerators 1602a-1602n can be stored in the DRAM 1630. Different programs can cause the accelerators 1602a-1602n to perform different operations. For example, when one of the accelerators is a neural network accelerator, one program can configure the neural network accelerator to perform speech recognition while another program can configure the neural network accelerator to perform image recognition. In various examples, different accelerators 1602a-1602n can be programmed with different programs, so that each performs a different set of operations. In various examples, the processors 1648a-1648s can manage moving of program code from the DRAM 1630 to the accelerators 1602a-1602n.

The example acceleration engine 1600 further includes I/O controllers 1644a-1644p for communicating with I/O devices 1632 in the system. The acceleration engine 1600 can communicate with I/O devices over, for example, a processor bus. In some examples, the processor bus can be implemented using Peripheral Component Interconnect (PCI) and/or a variation of the PCI bus protocol. The processor bus can connect the acceleration engine 1600 to I/O devices such as, for example, input and output devices, memory controllers, storage devices, and/or network interface cards, among other things. In some examples, the I/O controllers 1644-1644p can enable the acceleration engine 1600 to act as an I/O device for a host processor. For example, the acceleration engine 1600 can be the recipient of input data from the host processor, and a command indicating an operation to be performed on the input data (e.g., a particular computation or analysis). In the illustrated example, the acceleration engine 1600 includes p I/O controllers 1644a-1644p, each of which may include a separate root complex and may communicate with a separate set of I/O devices 1632. In other examples, other standardized bus protocols, such as Ultra Path Interconnect (UPI) can be used for the host bus. In other examples, a proprietary bus protocol can be used.

Movement of data in the acceleration engine 1600 can be managed by one or more processors 1648a-1648s, which can also be referred to as data management processors. In the example of FIG. 16, the acceleration engine 1600 includes s processors 1648a-1648s incorporated into the device (e.g., on the same silicon die). In other examples, the processors 1648a-1648s can be external to the acceleration engine 1600 (e.g., on a different die and/or in a different package). In some examples, the processors 1648a-1648s can manage the movement of data from I/O devices 1632 to the accelerators 1602a-1602n or the DRAM 1630. For example, input data may be located at an I/O device 1632 or in processor memory, and the processors 1648a-1648s can move the input from the I/O device 1632 or processor memory into an accelerator or into DRAM 1630. As another example, program code for the accelerators 1602a-1602n may be located on an I/O device 1632 or in processor memory.

The example acceleration engine 1600 further includes DMA engines 1646a-1646d that can move data between the accelerators 1602a-1602n, DRAM controllers 1642a-1642k, and I/O controllers 1644a-1644p. In the illustrated example, the acceleration engine 1600 includes d DMA engines 1646a-1646d. In some implementations, the DMA engines 1646a-1646d can be assigned to specific tasks, such as moving data from the DRAM controllers 1642a-1642d to the accelerators 1602a-1602n, or moving data between the I/O controllers 1644a-1644p and the accelerators 1602a-1602n. These tasks can be assigned, for example, by enqueueing descriptors with the DMA engines 1646a-1646d, where a descriptor identifies an address for a block of data and an operation (e.g., a read or a write) to perform. A descriptor, for example, can direct a DMA engine to instruct a DMA controller to read a block of data from DRAM 1630. A descriptor can, as a further example, instruct the DMA engine to write data, read by the DMA controller, to an accelerator. Further descriptors can be used to move data from an accelerator to DRAM 1630.

In various examples, each of the processors 1648a-1648s can be responsible for managing the data movement for a different accelerator. In some examples, a processor may manage the data movement for more than one accelerator. Similarly, in various examples, each of the processors 1648a-1648s can be assigned to one or more DMA engines 1646a-1646d. In these and other examples, associations between processors 1648a-1648s, accelerators 1602a-1602n, and DMA engines 1646a-1646d are determined by program code being executed by each respective processor.

In the example acceleration engine 1600, the various components can communicate over a chip interconnect 1620. The chip interconnect 1620 primarily includes wiring for routing data between the components of the acceleration engine 1600. In some cases, the chip interconnect 1620 can include a minimal amount of logic, such as multiplexors to control the direction of data, flip-flops for handling clock domain crossings, and timing logic.

Figure 17:
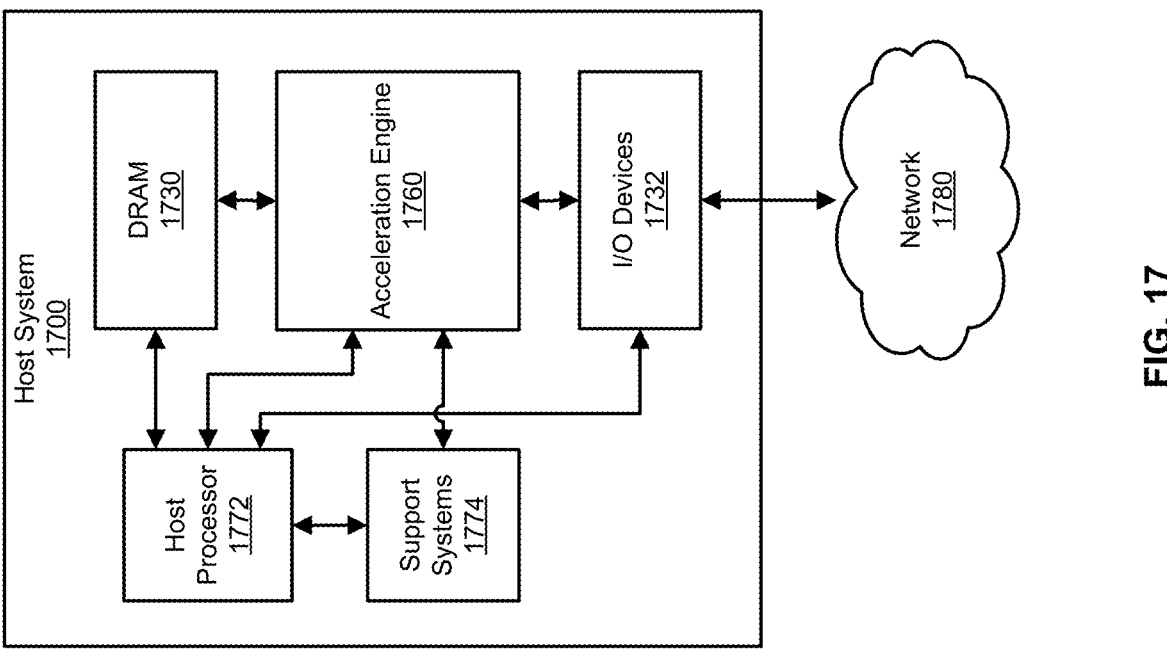
FIG. 17 illustrates a block diagram of an example of a host system.

FIG. 17 includes a block diagram that illustrates an example of a host system 1700 in which an acceleration engine 1760 can be used. The acceleration engine 1760 of FIG. 17 is an example of a device that can include one or more accelerators such as is illustrated in FIG. 16. The example host system 1700 of FIG. 17 includes the acceleration engine 1760, a host processor 1772, DRAM 1730 or processor memory, I/O devices 1732, and support systems 1774. In various implementations, the host system 1700 can include other hardware that is not illustrated here.

The host processor 1772 is a general-purpose integrated circuit that is capable of executing program instructions. In some examples, the host processor 1772 can include multiple processing cores. A multi-core processor may include multiple processing units within the same processor. In some examples, the host system 1700 can include more than one host processor 1772. In some examples, the host processor 1772 and the acceleration engine 1760 can be one chip, such as, one or more integrated circuits within the same package.

In various examples, the host processor 1772 can communicate with other components in the host system 1700 over one or more communication channels. For example, the host system 1700 can include a host processor bus, which the host processor 1772 can use to communicate with the DRAM 1730, for example. As another example, the host system 1700 can include an I/O bus, such as a PCI-based bus, over which the host processor 1772 can communicate with the acceleration engine 1760 and/or the I/O devices 1732, for example. In various examples, the host system 1700 can, alternatively or additionally, include other communication channels or busses, such as serial busses, power management busses, storage device busses, and so on.

In some examples, software programs executing on the host processor 1772 can receive or generate input for processing by the acceleration engine 1760. In some examples, the programs can select an appropriate neural network to execute for a given input. For example, a program may be for language translation, and can select one or more neural networks capable of speech recognition and/or machine translation. In these and other examples, the programs can configure the acceleration engine 1760 with the neural network to execute, and/or can select a neural network processing engine on the acceleration engine 1760 that has previously been configured to execute the desired neural network. In some examples, once the acceleration engine 1760 has started an inference on input data, the host processor 1772 can manage the movement of data (such as weights, instructions, intermediate results, results of conditional layers, and/or final results) into or out of the acceleration engine 1760.

In some examples, a software program that is using the acceleration engine 1760 to conduct an inference can read the result from a conditional layer from the acceleration engine 1760 and/or from a storage location, such as in DRAM 1730. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1730 is memory that is used by the host processor 1772 for storage of program code that the host processor 1772 is in the process of executing, as well as values that are being operated on. In some examples, the data for a neural network (e.g., weight values, instructions, and other data) can be all or partially stored in the DRAM 1730. DRAM is a common term for processor memory, and though DRAM is volatile memory, processor memory can be volatile and/or non-volatile. Though not illustrated here, the host system 1700 can include other volatile and non-volatile memories for other purposes. For example, the host system 1700 can include a Read-Only Memory (ROM) that stores boot code for booting the host system 1700 at power on, and/or Basic Input/Output System (BIOS) code.

Though not illustrated here, the DRAM 1730 can store instructions for various programs, which can be loaded into and be executed by the host processor 1772. For example, the DRAM 1730 can be storing instructions for an operating system, one or more data stores, one or more application programs, one or more drivers, and/or services for implementing the features disclosed herein.

The operating system can manage and orchestrate the overall operation of the host system 1700, such as scheduling tasks, executing applications, and/or controller peripheral devices, among other operations. In some examples, a host system 1700 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1700. For example, some drivers can provide communication between the operating system and peripheral devices or I/O devices 1732. Alternatively or additionally, some drivers may provide communication between application programs and the operating system, and/or application programs and peripheral devices accessible to the host system 1700. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1732 can include hardware for connecting to user input and output devices, such as keyboards, mice, pens, tablets, voice input devices, touch input devices, displays or monitors, speakers, and printers, among other devices. The I/O devices 1732 can also include storage drives and/or network interfaces for connecting to a network 1780. For example, the host system 1700 can use a network interface to communicate with storage devices, user terminals, other computing devices or servers, and/or other networks, among various examples.

In various examples, one or more of the I/O devices 1732 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1700 or may be in an external enclosure. A storage device can be fixed (e.g., attached by screws) or removable (e.g., having a physical release mechanism and possibly a hot-plug mechanism).

Storage devices, the DRAM 1730, and any other memory component in the host system 1700 are examples of computer-readable storage media. Computer-readable storage media are physical mediums that are capable of storing data in a format that can be read by a device such as the host processor 1772. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1732 can be PCI-based devices. In these examples, a PCI-based I/O device includes a PCI interface for communicating with the host system 1700. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1774 can include hardware for coordinating the operations of the acceleration engine 1760. For example, the support systems 1774 can include a microprocessor that coordinates the activities of the acceleration engine 1760, including moving data around on the acceleration engine 1760. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1772. In some examples, the program executed by the microprocessor is stored on the hardware of microprocessor, or on a non-volatile memory chip in the host system 1700. In some examples, the microprocessor and the acceleration engine 1760 can be on chip, such as one integrated circuit on the same die and in the same package.

In some examples, the support systems 1774 can be responsible for taking instructions from the host processor 1772 when programs executing on the host processor 1772 request the execution of a neural network. For example, the host processor 1772 can provide the support systems 1774 with a set of input data and a task that is to be performed on the set of input data. In this example, the support systems 1774 can identify a neural network that can perform the task, and can program the acceleration engine 1760 to execute the neural network on the set of input data. In some examples, the support systems 1774 only needs to select an appropriate neural network processing engine of the neural network processor. In some examples, the support systems 1774 may need to load the data for the neural network onto the acceleration engine 1760 before the acceleration engine 1760 can start executing the neural network. In these and other examples, the support systems 1774 can further receive the output of executing the neural network, and provide the output back to the host processor 1772.

In some examples, the operations of the support systems 1774 can be handled by the host processor 1772. In these examples, the support systems 1774 may not be needed and can be omitted from the host system 1700.

In various examples, the host system 1700 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1700 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:

obtaining a weight tensor of a neural network model;

dividing the weight tensor into a plurality of weight groups;

for each of the weight groups, determining a pruning cost of compressing weight values of the weight group according to a first compression ratio that replaces a number of smallest magnitude weight values in the weight group with zeros, wherein the pruning cost is determined by calculating an average of absolute values of the smallest magnitude weight values being replaced with zeros;

generating a pruning cost distribution of the weight groups;

selecting a cost threshold from the pruning cost distribution based on a mean or median of the pruning cost distribution; and compressing a first set of weight groups having a pruning cost below the cost threshold according to the first compression ratio to generate a sparse neural network model that occupies a smaller amount of memory than the neural network model.

2. The computer-implemented method of claim 1, wherein generating the sparse neural network model further includes compressing a second set of weight groups having a pruning cost at or above the cost threshold according to a second compression ratio that is less than the first compression ratio.

3. The computer-implemented method of claim 2, wherein the first and second compression ratios are N:4 compression ratios, wherein N being the number of original rows and 4 being the number of rows after compression, and wherein N of the first compression ratio is greater than N of the second compression ratio.

4. The computer-implemented method of claim 1, further comprising:

dividing remaining weight groups that are not part of the first set of weight groups into weight subgroups;

for each of the weight subgroups, determining a subgroup pruning cost of compressing the weight values of the weight subgroup according to a second compression ratio;

generating a subgroup pruning cost distribution of the weight subgroups;

selecting a subgroup cost threshold from the subgroup pruning cost distribution; and compressing a set of weight subgroups having a subgroup pruning cost below the subgroup cost threshold according to the second compression ratio.

5. The computer-implemented method of claim 1, wherein the sparse neural network model includes one or more uncompressed weight groups.

6. The computer-implemented method of claim 1, wherein generating the sparse neural network model further includes generating metadata tags for each non-zero weight value remaining in the compressed first set of weight groups indicating a position of the non-zero weight value.

7. The computer-implemented method of claim 1, further comprising:

retraining the neural network using the sparse neural network model; and determining whether the sparse neural network model satisfies a network accuracy target.

8. The computer-implemented method of claim 7, further comprising:

determining that the sparse neural network model fails to satisfy the network accuracy target; and selecting a lower cost threshold from the cost threshold distribution to generate a second sparse neural network model.

9. The computer-implemented method of claim 1, wherein each weight group is a set of rows of weight values of a two-dimensional weight tensor.

10. The computer-implemented method of claim 9, wherein the two-dimensional weight tensor is obtained by flattening weight matrices of a multi-layer neural network model.

11. The computer-implemented method of claim 1, further comprising constraining weight groups belonging to a same layer of the neural network model to use a same compression ratio.

12. The computer-implemented method of claim 1, wherein the first compression ratio is a L:R compression ratio, wherein L represents the number of original weight values, and R represents the number of weight values after pruning, and wherein R is less than or equal to 4.

13. The computer-implemented method of claim 12, wherein L is less than or equal to 16.

14. The computer-implemented method of claim 1, wherein the first compression ratio is selected based on a native compression support of a systolic array.

15. The computer-implemented method of claim 14, wherein the native compression support of the systolic array is determined by the number of feature map channels provided to a row group of the systolic array.

16. A non-transitory computer readable medium having stored therein instructions that, when executed by one or more processors, cause the one or more processors to performing operations including:

obtaining a weight tensor of a neural network model;

selecting a first cost threshold associated with a first compression ratio;

compressing a first set of weight groups having a pruning cost below the first cost threshold according to the first compression ratio, wherein the pruning cost is determined by calculating an average of absolute values of the smallest magnitude weight values being replaced with zeros, and the first cost threshold is selected based on a mean or median of a pruning cost distribution of the first set of weight groups; and compressing a second set of weight groups according to a second compression ratio that is less than the first compression ratio to generate a sparse neural network model that occupies a smaller amount of memory than the neural network model.

17. The non-transitory computer readable medium of claim 16, wherein the second set of weight groups has a pruning cost below a second cost threshold associated with the second compression ratio.

18. The non-transitory computer readable medium of claim 16, wherein the operations further include:

generating metadata tags for each non-zero weight value remaining in the compressed first set of weight groups and the compressed second set of weight groups indicating a position of the non-zero weight value.

19. The non-transitory computer readable medium of claim 16, wherein the instructions are compiler instructions for a compiler executed by the one or more processors.

20. The non-transitory computer readable medium of claim 16, wherein each weight group is a set of rows of weight values of a two-dimensional weight tensor.

* * * * *